(12) United States Patent
Nalepka et al.

(10) Patent No.: US 10,166,920 B2
(45) Date of Patent: Jan. 1, 2019

(54) TRACTOR-TRAILER CONNECTIONS FOR IMAGE CAPTURE DATA

(71) Applicant: Trimble Navigation Limited, Sunnyvale, CA (US)

(72) Inventors: Michael D. Nalepka, Franklin, TN (US); James W. Angel, Mansfield, TX (US); Ricky L. Ochsendorf, Prior Lake, MN (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 14/930,381

(22) Filed: Nov. 2, 2015

(65) Prior Publication Data

US 2016/0052453 A1 Feb. 25, 2016

Related U.S. Application Data

(63) Continuation of application No. 14/829,545, filed on Aug. 18, 2015.

(Continued)

(51) Int. Cl.
*B60R 1/00* (2006.01)
*G06K 9/00* (2006.01)
(Continued)

(52) U.S. Cl.
CPC ............ *B60R 1/00* (2013.01); *G06K 9/00718* (2013.01); *H01R 27/02* (2013.01); *H04N 5/247* (2013.01);
(Continued)

(58) Field of Classification Search
CPC ......... B60Q 1/0023; B60R 1/00; B60R 1/003; B60R 2300/105; B60R 2300/40;
(Continued)

(56) References Cited

U.S. PATENT DOCUMENTS 5,917,433 A * 6/1999 Keillor ..................... G08G 1/20
340/540
6,259,475 B1 * 7/2001 Ramachandran ........ H04N 7/18
348/117

(Continued)

FOREIGN PATENT DOCUMENTS

EP 1720142 11/2006

OTHER PUBLICATIONS

International Search Report and Written Opinion dated Nov. 11, 2015 from PCT App. No. PCT/US2015/045766, 16 pages.

(Continued)

*Primary Examiner* — Deirdre L Beasley
(74) *Attorney, Agent, or Firm* — Hollingsworth Davis, LLC

(57) ABSTRACT

A system comprises a transmitter unit configured for mounting at a trailer connected to a tractor. The transmitter unit comprises a video input for receiving video data from one or more trailer cameras, a power input for receiving power from a power line of the trailer, and a wireless communication module for communicating with a mobile communication device. A memory is configured to store trailer information received from the wireless communication module, the trailer information uniquely identifying the trailer. A transmitter is configured to wirelessly transmit the video data. A receiver unit is configured for mounting at the tractor and comprises a receiver for wirelessly receiving the video data transmitted by the transmitter, a power input for receiving power from a power line of the tractor, and an output for outputting the received video data. The receiver unit is further configured to receive the trailer information from the transmitter unit.

24 Claims, 16 Drawing Sheets

Related U.S. Application Data

(60) Provisional application No. 62/038,710, filed on Aug. 18, 2014.

(51) Int. Cl.
*H04N 5/247* (2006.01)
*H04N 5/44* (2011.01)
*H04N 7/18* (2006.01)
*H01R 27/02* (2006.01)

(52) U.S. Cl.
CPC .............. *H04N 5/44* (2013.01); *H04N 7/181* (2013.01); *H04N 7/188* (2013.01); *B60R 2300/105* (2013.01); *B60R 2300/40* (2013.01); *B60R 2300/406* (2013.01); *B60R 2300/70* (2013.01); *G06K 2009/00738* (2013.01); *H01R 2201/26* (2013.01); *H04N 7/185* (2013.01)

(58) Field of Classification Search
CPC .......... B60R 2300/406; B60R 2300/70; G06K 2009/00738; G06K 9/00718; G08B 13/196; H04N 5/247; H04N 5/44; H04N 7/181; H04N 7/185; H04N 7/188
See application file for complete search history.

(56) References Cited

U.S. PATENT DOCUMENTS

| | | | | |
|---|---|---|---|---|
| 6,687,609 | B2* | 2/2004 | Hsiao | G08G 1/20 340/993 |
| 6,970,772 | B2* | 11/2005 | Radtke | H04B 3/548 303/122.06 |
| 7,307,514 | B2* | 12/2007 | McAden | B60R 25/00 180/167 |
| 7,932,815 | B2 | 4/2011 | Martinez et al. | |
| 8,232,871 | B2 | 7/2012 | Lesesky | |
| 8,680,976 | B2* | 3/2014 | Lesesky | B60R 16/0315 340/431 |
| 8,957,770 | B2* | 2/2015 | Hu | B60D 1/62 340/425.5 |
| 2003/0222982 | A1* | 12/2003 | Hamdan | H04N 7/181 348/148 |
| 2005/0062590 | A1* | 3/2005 | Lang | B60D 1/62 340/431 |
| 2005/0242931 | A1* | 11/2005 | Gunderson | B60R 21/013 340/431 |
| 2007/0038346 | A1* | 2/2007 | Ehrlich | G07C 5/008 701/31.4 |
| 2008/0143593 | A1* | 6/2008 | Graziano | G01S 5/0027 342/357.46 |
| 2008/0227411 | A1* | 9/2008 | Martinez | B60D 1/62 455/90.1 |
| 2011/0096166 | A1* | 4/2011 | Englander | H04N 7/183 348/148 |
| 2011/0279253 | A1* | 11/2011 | Suda | G06Q 10/0833 340/431 |
| 2012/0330480 | A1* | 12/2012 | Nishiseko | G08G 1/168 701/1 |
| 2013/0083196 | A1* | 4/2013 | Zheng | G07C 5/0891 348/148 |
| 2013/0107044 | A1* | 5/2013 | Azevedo | H04N 7/18 348/148 |
| 2013/0147617 | A1* | 6/2013 | Boling | G08B 21/18 340/431 |
| 2013/0148748 | A1* | 6/2013 | Suda | H04B 3/546 375/257 |
| 2014/0081543 | A1* | 3/2014 | Fry | B60T 8/323 701/70 |
| 2014/0081544 | A1* | 3/2014 | Fry | B60T 8/323 701/70 |
| 2015/0025766 | A1* | 1/2015 | Mederer | B60T 8/1708 701/70 |
| 2015/0116114 | A1* | 4/2015 | Boyles | G08B 25/00 340/539.17 |
| 2015/0172518 | A1* | 6/2015 | Lucas | H04N 5/2251 348/148 |

OTHER PUBLICATIONS

Maryanka, "Using Power Line Communication for Harness Reduction in Automotive", Yamar Electronics Ltd., 2011, 4 pages.
Corrigan, "Introduction to the Controller Area Network (CAN", Texas Instruments, Jul. 2008, 15 pages.
"Serial Data Communications Between Microcomputer Systems in Heavy-Duty Vehicle Applications", SAE International, Aug. 2004, 16 pages.
Lin et al, "Evaluation of the Power Line Motor Carrier Rearview Video System", Jun. 2009, 147 pages.
Britell, "Collison Avoidance Through Improved Communication Between Tractor and Trailer", Nov. 1994, 18 pages.

* cited by examiner

TRACTOR-TRAILER CONNECTIONS FOR IMAGE CAPTURE DATA

RELATED PATENT DOCUMENTS

This application is a continuation of U.S. Ser. No. 14/829,545, filed Aug. 18, 2015, which claims the benefit of Provisional Patent Application Ser. No. 62/038,710, filed on Aug. 18, 2014, to which priority is claimed pursuant to 35 U.S.C. § 119(e), and which are incorporated herein by reference in their entireties.

TECHNICAL FIELD

This application relates generally to devices, systems, and methods pertaining to image capture devices deployed at a vehicle comprising a tractor and a trailer, and transmission of image data between the vehicle trailer and the tractor.

SUMMARY

Various embodiments involve devices, systems, and methods for transmitting signals from a trailer to a tractor through a tractor-trailer connection.

Various embodiments are directed to a system for use on a vehicle comprising a tractor and a trailer. The system comprises a transmitter unit configured for mounting at the trailer. The transmitter unit comprises a video input configured to receive video data from one or more cameras mounted at the trailer, and a power input configured to receive power from a power line of the trailer. A wireless communication module is configured to communicate with a mobile communication device. A memory is configured to store trailer information received from the wireless communication module, the trailer information comprising at least trailer ID data that uniquely identifies the trailer. A transmitter is configured to wirelessly transmit the video data. A receiver unit is configured for mounting at the tractor. The receiver unit comprises a receiver configured to wirelessly receive the video data transmitted by the transmitter, a power input configured to receive power from a power line of the tractor, and an output configured to output the received video data. The receiver unit is further configured to receive the trailer information from the transmitter unit.

According to some embodiments, a system for use on a vehicle comprising a tractor and a trailer includes an event detector configured to generate a trigger signal in response to occurrence of predetermined events. The system also comprises a media recorder, a communications device configured to effect communications between the system and a remote system, and an onboard computer coupled to the event detector, the media recorder, and the communications device. One or more image capture devices are mounted at the trailer. A wireless communication apparatus is coupled to the media recorder and comprises a transmitter unit and a receiver unit. The transmitter unit is configured for mounting at the trailer and to wirelessly transmit image data received from the one or more image capture devices. The transmitter unit comprises a wireless communication module configured to effect communication with a mobile communication device and further comprises a memory configured to store trailer information received from the wireless communication module. The receiver unit is configured for mounting at the tractor and to wirelessly receive the image data transmitted by the transmitter unit. The receiver unit is further configured to output the received image data to the media recorder and to receive the trailer information from the transmitter unit. The onboard computer is configured to coordinate recording of at least the image data on the media recorder in response to the trigger signal.

Other embodiments are directed to a method for use on a vehicle comprising a tractor and a trailer. The method comprises transmitting trailer information including trailer ID information from the trailer, and monitoring for occurrences of predetermined events while the vehicle is in operation. The method comprises, in response to detecting a predetermined event, wirelessly transmitting video from the trailer, receiving the video and the trailer information at the tractor, and recording at least the video at the tractor.

In some embodiments, a system may include an event detector configured to generate a trigger signal in response to occurrence of predetermined events, a media recorder, a communications device configured to effect communications between the system and a remote system, an onboard computer coupled to the event detector, the media recorder, and the communications device, one or more image capture devices situated within the trailer, and a tractor-trailer connection. The tractor-trailer connection is configured to communicatively couple the one or more image capture devices to one or both of the onboard computer and the media recorder. The onboard computer coordinates recording of image data received from the one or more image capture devices on the media recorder in response to the trigger signal.

According to some embodiments, a system for use on a vehicle comprising a tractor and a trailer includes a sensor configured for installation on the trailer and to produce a sensor signal in response to a sensed event, an auxiliary detector configured to receive the sensor signal and generate an auxiliary detector signal in response to the sensor signal exceeding one or more thresholds, an event detector configured to generate a trigger signal in response to occurrence of predetermined events, a media recorder, a communications device configured to effect communications between the system and a remote system, an onboard computer coupled to the event detector, the media recorder, and the communications device, one or more image capture devices situated within the trailer, and a tractor-trailer connection. The tractor-trailer connection communicatively couples the one or more image capture devices to one or both of the onboard computer and the media recorder. The onboard computer is configured to coordinate recording of image data received from the one or more image capture devices on the media recorder and store event data in response to one or both of the auxiliary detector signal and the trigger signal.

According to some embodiments, a system for use on a vehicle comprising a tractor and a trailer includes a communications device configured to effect communications between the system and a remote system, the communications device configured to receive data from the remote system, an event detector configured to generate a trigger signal in response to detecting occurrence of predetermined events, wherein operation of the event detector is affected by the data received from the remote system, a media recorder, an onboard computer coupled to the event detector, the media recorder, and the communications device, one or more image capture devices situated within the trailer, and a tractor-trailer connection. The tractor-trailer connection communicatively couples the one or more image capture devices to one or both of the onboard computer and the media recorder. The onboard computer is configured to coordinate recording of image data received from the one or more image capture devices on the media recorder and store event data in response to one or both of the trigger signal and the data received from the remote system.

According to some embodiments, a system for use on a vehicle comprising a tractor and a trailer includes an event detector configured to generate a trigger signal in response to detecting occurrence of predetermined events, a media recorder, a communications device configured to effect communications between the system and a remote system, an onboard computer coupled to the event detector, the media recorder, and the communications device, the onboard computer configured to communicate with a computer of the vehicle, one or more image capture devices situated on the vehicle, including one or more images capture devices situated on and/or within the trailer, and a tractor-trailer connection. The tractor-trailer connection is configured communicatively couple image data from the one or more image capture devices situated on and/or within the trailer to one or both of the onboard computer and the media recorder. The onboard computer is configured to coordinate capturing of image data received from the one or more image capture devices in response to trigger signals and to transmit the captured image data and event data derived from vehicle computer data in substantially real-time to the remote system.

In some embodiments, a system for use on a vehicle comprising a tractor and a trailer includes an event detector configured to generate a trigger signal in response to detecting occurrence of predetermined events, a media recorder, a communications device configured to effect communications between the system and a remote system, an onboard computer coupled to the event detector, the media recorder, and the communications device, the onboard computer configured to communicate with a computer of the vehicle, a display configured for operation within the tractor and coupled to the onboard computer, one or more image capture devices situated on and/or within the vehicle, including one or more image capture devices situated on the trailer, and a tractor-trailer connection. The tractor-trailer connection is configured to communicatively couple the one or more image capture devices situated on and/or within the trailer to one or both of the onboard computer and the media recorder. The onboard computer is configured to coordinate capturing of image data received from the one or more image capture devices in response to trigger signals and to transmit the captured image data and event data derived from vehicle computer data in substantially real-time to the display and the remote system.

According to some embodiments, a system for use on a vehicle comprising a tractor and a trailer includes an event detector configured to generate a trigger signal in response to detecting occurrence of predetermined events, a media recorder, a communications device configured to effect communications between the system and a remote system, the communications device configured to receive a command signal from the remote system, an onboard computer coupled to the event detector, the media recorder, and the communications device, the onboard computer configured to communicate with a computer of the vehicle, one or more image capture devices situated on and/or within the vehicle, including one or more image capture devices situated on and/or within the trailer; and a tractor-trailer connection. The tractor-trailer connection configured to communicatively couple the one or more image capture devices situated on and/or within the trailer to one or both of the onboard computer and the media recorder. An onboard computer is configured to coordinate capturing of image data received from the one or more image capture devices in response to one or both of the trigger signals and the command signal, and to transmit the captured image data and event data derived from vehicle computer data in substantially real-time to the remote system in response to the command signal.

In some embodiments, a system for use on a vehicle comprising a tractor and a trailer includes an event detector coupled to the onboard computer and configured to generate a trigger signal in response to detecting occurrence of predetermined events, an onboard computer coupled to the event detector and configured to communicate with a computer of the vehicle and an external source of data, one or more image capture devices situated at the vehicle, including one or more image capture devices disposed on and/or within the trailer, and a tractor-trailer connection. The tractor-trailer connection is configured to communicatively couple the one or more image capture devices situated on and/or within the trailer to the onboard computer. The onboard computer is configured to adjust an image capture strategy affecting the one or more image capture devices based on data received from the external source and to store image data received from the one or more image capture devices and event data in response to the trigger signal.

In some embodiments, a system for use on a vehicle comprising a tractor and a trailer includes a communications device configured to effect communications between the system and a remote system, the communications device configured to receive data from a source external to the vehicle, an event detector configured to generate a trigger signal in response to detecting occurrence of predetermined events, a media recorder, an onboard computer coupled to the communications device, the event detector, and the media recorder, the onboard computer configured to communicate with a computer of the vehicle, one or more image capture devices situated at the vehicle including one or more image capture devices situated on and/or within the trailer, and a tractor-trailer connection. The tractor-trailer connection is configured to communicatively couple the one or more image capture devices situated on and/or within the trailer to one or both of the onboard computer and the media recorder. The onboard computer is configured to adjust one or more parameters of the image capture devices based on the data received from the external source and coordinate recording of image data received from the one or more image capture devices on the media recorder and to store event data in response to the trigger signal.

According to some embodiments, a system for use on a vehicle comprising a tractor and a trailer includes a communications device configured to effect communications between the system and a remote system, the communications device configured to receive data from a source external to the vehicle, an event detector configured to generate a trigger signal in response to detecting occurrence of predetermined events, a media recorder, an onboard computer coupled to the communications device, the event detector, and the media recorder, the onboard computer configured to communicate with a computer of the vehicle, one or more image capture devices situated at the vehicle including one or more image capture devices situated on and/or within the trailer, and a tractor-trailer connection. The tractor-trailer connection is configured to communicatively couple the one or more image capture devices situated on and/or within the trailer to one or both of the onboard computer and the media recorder. The onboard computer is configured to adjust an image capture strategy affecting the one or more image capture devices based on the data received from the external source and coordinate recording of image data received from the one or more image capture devices on the media recorder and to store event data in response to the trigger signal.

In some embodiments a system for use on a vehicle comprising a tractor and a trailer includes an event detector configured to generate a trigger signal in response to detecting occurrence of predetermined events, an onboard computer coupled to the event detector and configured to communicate with a computer of the vehicle and an external source of data, one or more image capture devices situated at the vehicle including one or more image capture devices situated on and/or within the trailer, and a tractor-trailer connection. The tractor-trailer connection is configured to communicatively couple the one or more image capture devices situated on and/or within the trailer to the onboard computer. The onboard computer is configured to modify one or more parameters of the event detector based on data received from the external source and to store image data received from the one or more image capture devices and event data in response to a trigger signal generated by the modified event detector.

According to some embodiments, a system for use on a vehicle comprising a tractor and a trailer includes a communications device configured to effect communications between the system and a remote system, the communications device configured to receive data from a source external to the vehicle, an event detector configured to generate a trigger signal in response to detecting occurrence of predetermined events, wherein operation of the event detector is modified by the data received from the external source, a media recorder; an onboard computer coupled to the communications device, the event detector, and the media recorder, the onboard computer configured to communicate with a computer of the vehicle, one or more image capture devices situated at the vehicle including one or more image capture devices situated on and/or within the trailer, and a tractor-trailer connection. The tractor-trailer connection is configured to communicatively couple the one or more image capture devices situated on and/or within the trailer to one or both of the onboard computer and the media recorder. The onboard computer is configured to coordinate recording of image data received from the one or more image capture devices on the media recorder and to store event data in response to a trigger signal generated by the modified event detector.

Some embodiments are directed to a system for use on a vehicle comprising a tractor and a trailer that includes a communications device configured to effect communications between the system and a remote system, the communications device configured to receive data from a source external to the vehicle, an event detector configured to generate a trigger signal in response to detecting occurrence of predetermined events, a media recorder, an onboard computer coupled to the communications device, the event detector, and the media recorder, the onboard computer configured to communicate with a computer of the vehicle, one or more image capture devices situated at the vehicle including on or more image capture devices situated on and/or within the trailer, and a tractor-trailer connection. The tractor-trailer configured to communicatively couple the one or more image capture devices situated on and/or within the trailer to one or both of the onboard computer and the media recorder. The onboard computer is configured to modify an event detection strategy affecting at least the event detector based on data received from the external source and to coordinate recording of image data received from the one or more image capture devices on the media recorder and to store event data in response to a trigger signal generated by the modified event detector.

In some embodiments, a system for use with a vehicle comprising a tractor and a trailer includes one or more image capture devices including one or more images capture devices disposed on and/or within the trailer, an image processor positioned in the tractor and configured to estimate available cargo space within the trailer based on the images captured by the image capture devices, and a tractor-trailer connection. The tractor-trailer connection is configured to communicatively couple the one or more image capture devices positioned on and/or within the trailer to the image processor.

Some embodiments are directed to a system for use with a vehicle comprising a tractor and a trailer including one or more image capture devices including one or more images capture devices positioned on and/or within the trailer and configured to capture images, an image processor configured to determine dimensions of the cargo items using the captured images, a loading processor configured to generate a loading plan for the cargo items using the dimensions, and a tractor-trailer connection that that transfers the captured images between the trailer and the tractor.

According to some embodiments, a system for use with a vehicle comprising a tractor and a trailer includes one or more image capture devices including one or more image capture devices positioned on and/or within the trailer, each image capture device configured to capture images of cargo items as or after the cargo items are unloaded from the trailer, an image processor positioned in the tractor and configured to determine characteristics of the cargo items as the cargo items are unloaded from the trailer using the captured images, a docking processor configured to generate a cross-docking distribution plan for distributing the cargo items to a plurality of secondary trailers based on the characteristics, and a tractor-trailer connection configured to transfer the captured images from the trailer to the tractor.

In some embodiments a system for use with a vehicle comprising a tractor and a trailer, the system includes one or more image capture devices including one or more image capture devices positioned on and/or within the trailer, each image capture device configured to capture images of cargo items as the cargo items are loaded onto or unloaded from the trailer, an event detector positioned in the tractor and configured to detect one or both of anomalous loading and unloading events based on the captured images, and a tractor-trailer connection configured to transfer images between the trailer and the tractor.

According to some implementations, the tractor-trailer connection may be configured to communicatively couple the one or more image capture devices situated on the trailer to one or both of the onboard computer and the media recorder by powerline communication (PLC).

The tractor-trailer connection may be configured to communicatively couple the one or more image capture devices situated on the trailer to one or both of the onboard computer and the media recorder using a digital peripheral bus. For example, digital peripheral bus can include a Firewire, IEEE 1394, DisplayPort, Universal Serial Bus (USB) 2.0, or USB 3.0, or Gigabit Ethernet bus.

According to some implementations, the tractor-trailer connection includes a trailer connector comprising a unitary housing, first terminals disposed in a first area within the housing, at least some of the first terminals coupled to lights and/or to a low speed data bus of the trailer, second terminals disposed in a second area within the housing. The second terminals coupled to a video data bus configured to transfer video signals from the one or more image capture devices situated on and/or within the trailer.

For example, the first terminals may be arranged to be compatible with one or more of SAE J560, ISO 11446, ISO 7638, ISO 1724, ISO 3732, ISO 12098, ISO 1185, ISO 3731.

According to some aspects, the second terminals are electrical terminals configured to connect electrical conductors. In some embodiments, the second terminals are optoelectronic terminals configured to connect optical conductors.

According to some aspects, the tractor-trailer connection includes a wireless transmitter and wireless receiver configured to establish a wireless communication channel that communicatively couples the one or more image capture devices situated on and/or within the trailer to one or both of the onboard computer and the media recorder.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Communication between a tractor and trailer of a commercial vehicle can be accommodated by tractor-trailer connections comprising a tractor connector and a trailer connector connected by a cable. In addition to supplying electrical power to the trailer, the tractor-trailer connections provide switching signals to operate the trailer lights and may provide connections for one or more buses used to communicate data to and from various sensors and actuators. For example, some bus configurations currently in use include SAE J1939 and J11992—Control Area Network (CAN), SAE J2497—Powerline communication (PLC), and SAE J1708/1587, among others. Embodiments discussed herein involve capturing images from image capture devices disposed on and/or within a trailer, transferring the image capture data from the trailer to an on board system located in the tractor, and processing the images, along with other data, to provide image intelligence for a commercial vehicle.

Figure 1:
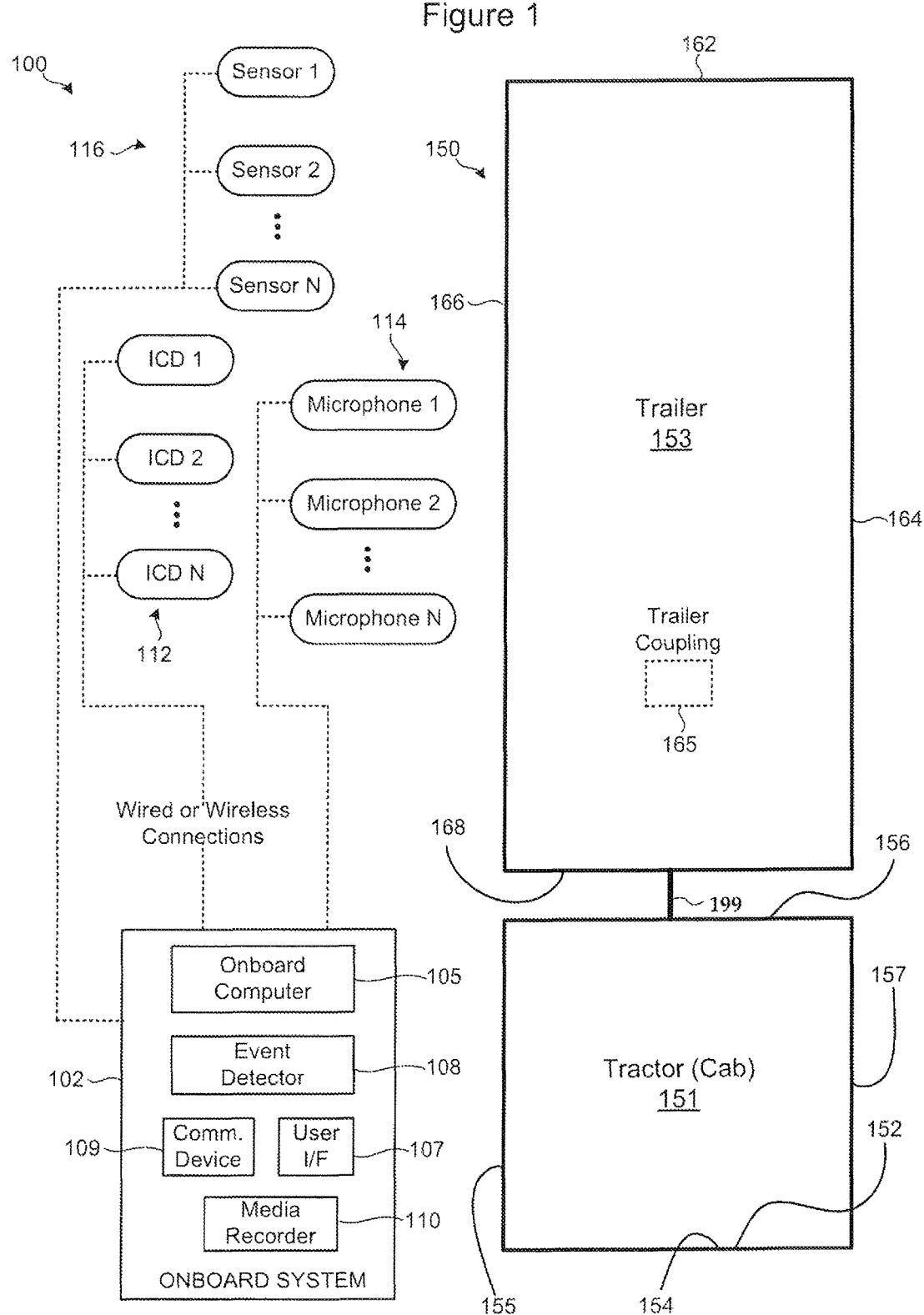
FIG. 1 is a block diagram of an apparatus for acquiring and processing image intelligence information for a commercial vehicle in accordance with various embodiments.

FIG. 1 is a block diagram of an apparatus 100 for acquiring and processing image intelligence information for a commercial vehicle 150 in accordance with various embodiments. Various embodiments described herein involve the use of images to enhance various aspects of vehicle operation and cargo transport. The images may comprise one or more of various types of images, including, but not limited to, still images, video, optical and/or laser scanned images, etc. The use of one or more of types of images to enhance vehicle operation, driver behavior, and/or to inform management of cargo and cargo vehicles is referred to herein as "image intelligence."

The apparatus 100 includes a tractor 151 and a trailer 153 on which various electronic components are respectively mounted. The electronic components include an onboard system 102 which is preferably mounted in the tractor 151 of the vehicle 150. The onboard system 102 is shown to include an onboard computer 105, an event detector 108, a user interface 107, a communication device 108, and a media recorder 110. Each of these components will be described in greater detail herein. The electronic components further include one or more image capture devices (ICDs) 112, one or more microphones 114, and one or more sensors 116. The image capture devices 112, microphones 114, and sensors 116 are communicatively coupled to the onboard system 102 via wired or wireless connections. It is understood that a given vehicle 150 may be equipped with some, but not necessarily all, of the data acquisition devices shown in FIG. 1 (i.e., image capture devices 112, microphones 114 and sensors 116), and that other data acquisition devices can be mounted to the vehicle 150.

Various embodiments are directed to systems and methods that utilize one or more image capture devices 112 deployed within the tractor 151, and trailer 153, or both the tractor 151 and trailer 153 of the vehicle 150. In addition to the image capture devices 112, the tractor 151 and/or trailer 153 can be equipped to include one or more of the sensors 116 and microphones 114. Various embodiments disclosed herein can include image capture devices 112 situated within the interior or on the exterior of the trailer 153, on the exterior of the tractor 151, and/or within the cab of the tractor 151. For example, the various data acquisition devices illustrated in FIG. 1 can be mounted at different locations in, on, and/or around the trailer 153 and tractor 151 of the vehicle 150. All locations on the interior and exterior surfaces of the trailer 153 and tractor 151 are contemplated.

By way of example, the trailer 153 can include any number of image capture devices 112 positioned in or on the various surfaces of the trailer 153. A single or multiple (e.g., stereoscopic) image capture devices 112 can be positioned on a rear surface 162 of the trailer 153, allowing for driver viewing in a rearward direction of the vehicle 150. One or more image capture devices 112 can be positioned on a left and a right side surface 164 and 166 of the trailer 153, allowing for driver viewing in a rearward and/or lateral direction of the vehicle 150. One or more image capture devices 112 may be positioned on the front surface of the trailer 153, such as at a lower position to facilitate viewing of the hitch area and hose/conduit connections between the trailer 153 and the tractor 151. A image capture device 112 may also be situated at or near the trailer coupling location 165 or at or near other locations along the lower surface of the trailer 153, such as near fuel hoses and other sensitive components of the trailer 153. Captured images can be transferred from the trailer 153 to the tractor 151 for processing through the tractor-trailer connection 199 which may provide for one or more of wired, wireless, or optical communication between tractor and trailer, for example.

In some embodiments, the tractor 151 includes a cab in which one or more image capture devices 112 and optionally microphones 114 and sensors 116 are mounted. For example, one image capture device 112 can be mounted on the dashboard 152 or rearview mirror 154 (or elsewhere) and directed outwardly in a forward-looking direction to monitor the roadway ahead of the tractor 151. A second image capture device 112 can be mounted on the dashboard 152 or rearview mirror 154 (or elsewhere) and directed toward the driver and passenger within the cab of the tractor 151. In some implementations, the second image capture device 112 can be directed toward the driver, while a third image capture device 112 can be directed toward the passenger portion of the cab of the tractor 151.

The tractor 151 can include one or more exterior image capture devices 112, microphones 114, and/or sensors 116 according to various embodiments, such as an image capture device 112 mounted on a left side 157, a right side 155, and/or a rear side 156 of the tractor 151. The exterior image capture devices 112 can be mounted at the same or different heights relative to the top or bottom of the tractor 151. Moreover, more than one image capture device 112 can be mounted on the left side 157, right side 155 or rear side 156 of the tractor 151. For example, single or multiple (e.g., stereoscopic) left and right side image capture devices 112 can be mounted rearward of the left and/or right doors of the tractor 151 or, alternatively, the near or on the left and/or right side mirror assemblies of the tractor 151. A first rear image capture device 112 can be mounted high on the rear side 156 of the tractor 151, while a lower rear image capture device 112 can be mounted at or near the hitch area of the tractor 151.

Figure 2A:
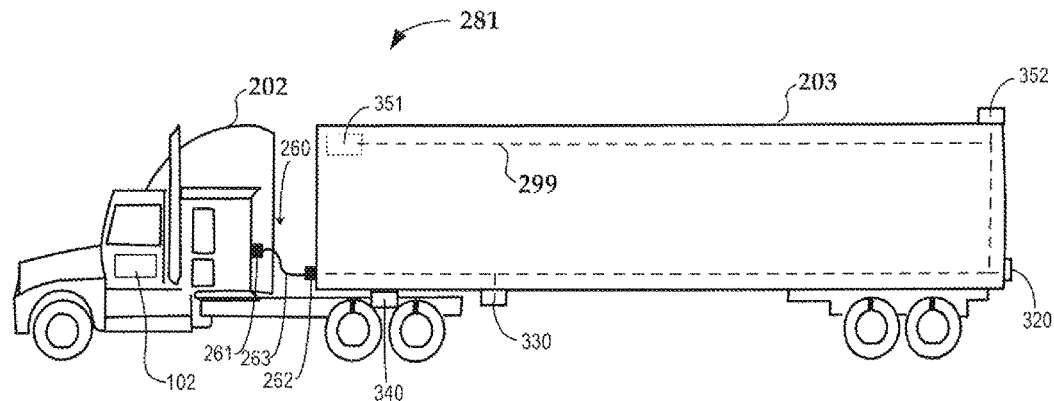
FIG. 2A is a diagram illustrating transmission of video from cameras disposed on and/or within a trailer using powerline communication (PLC) in accordance with some embodiments.

Powerline communication (PLC) is a technique that carries signals over a conductor that simultaneously provides power. In some embodiments disclosed herein, PLC is employed to enable transfer of data, audio, and/or video signals over the direct current (DC) battery power line supplied by the tractor to the trailer. FIG. 2A illustrates vehicle 281 including a tractor 202 and a trailer 203. The onboard system 102 located in the tractor 202 is communicatively coupled to cameras 351, 352 through a tractor-trailer connection 260 that includes at least one tractor connector 261, at least one trailer connector 262 and at least one cable 263. The tractor and trailer connectors 262, 263 may comprise 5-pin, 6-pin, 7-pin, 8-pin, 9-pin, and/or 13-pin connectors compatible with standard tractor-trailer connectors such as J560, ISO 1185, J1780, ISO 11446, ISO 7638, ISO 3732, ISO 1724, ISO 12098, ISO 3731, etc.

Figure 3A:
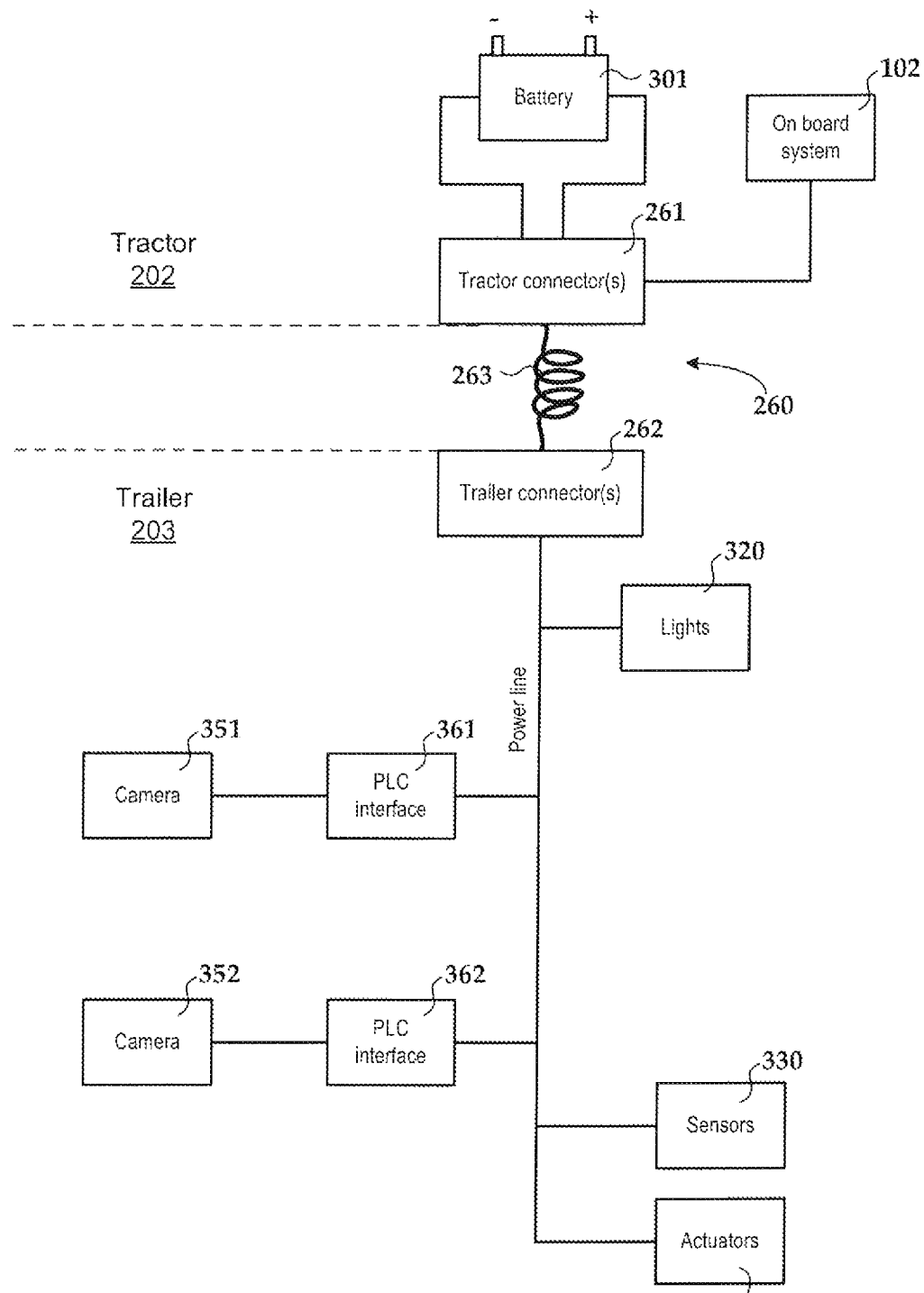
FIG. 3A is a schematic diagram illustrating PLC for video signals from video cameras disposed on and/or within a trailer.

FIG. 3A is a schematic diagram of PLC for video cameras 351, 352 located on and/or within the trailer 203. As shown in FIGS. 2A and 3A, power from the tractor battery 301 is provided to the trailer 203 through the tractor-trailer connection 260. The power line 299 in the trailer 203 provides power to various devices in the trailer, such as the turn signal, brake, and marker lights 320, various sensors 330, and/or actuators 340 and also provides power to one or more video cameras 351, 352 positioned on and/or within the trailer 203. Through PLC, the power line 299 also provides communicative coupling between the cameras 351, 352 and the onboard system 102. As shown in FIG. 3A, the video outputs of one or both cameras 351, 352 may be communicatively coupled to the power line 299 through PLC interfaces 361, 362. The PLC interfaces 361, 362 may be compatible with the SAE J2497 protocol standard, for example.

Figure 2B:
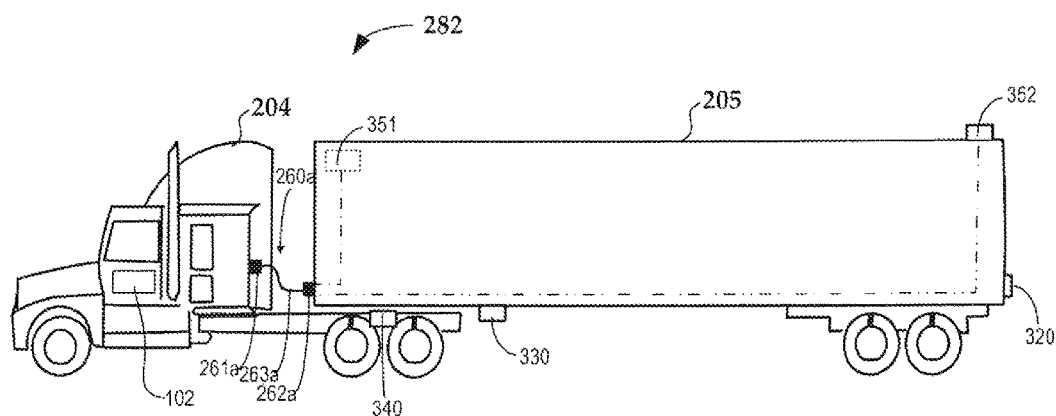
FIG. 2B is a diagram illustrating transfer of video data from cameras disposed on and/or within a trailer using point-two-point cables.
Figure 3B:
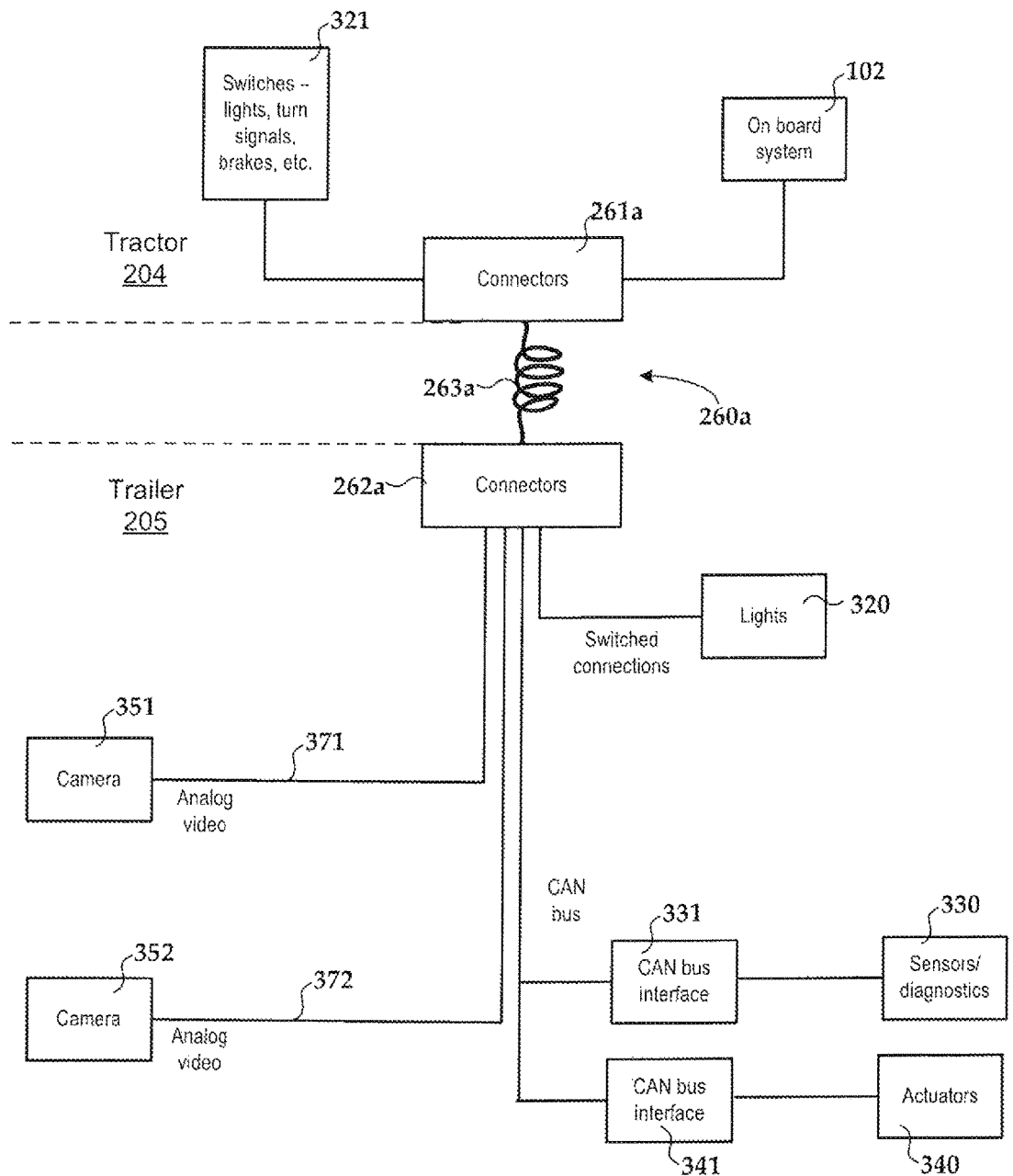
FIG. 3B is a schematic diagram illustrating an approach for transferring video from multiple cameras disposed on and/or within a trailer using separate cables.
Figure 3C:
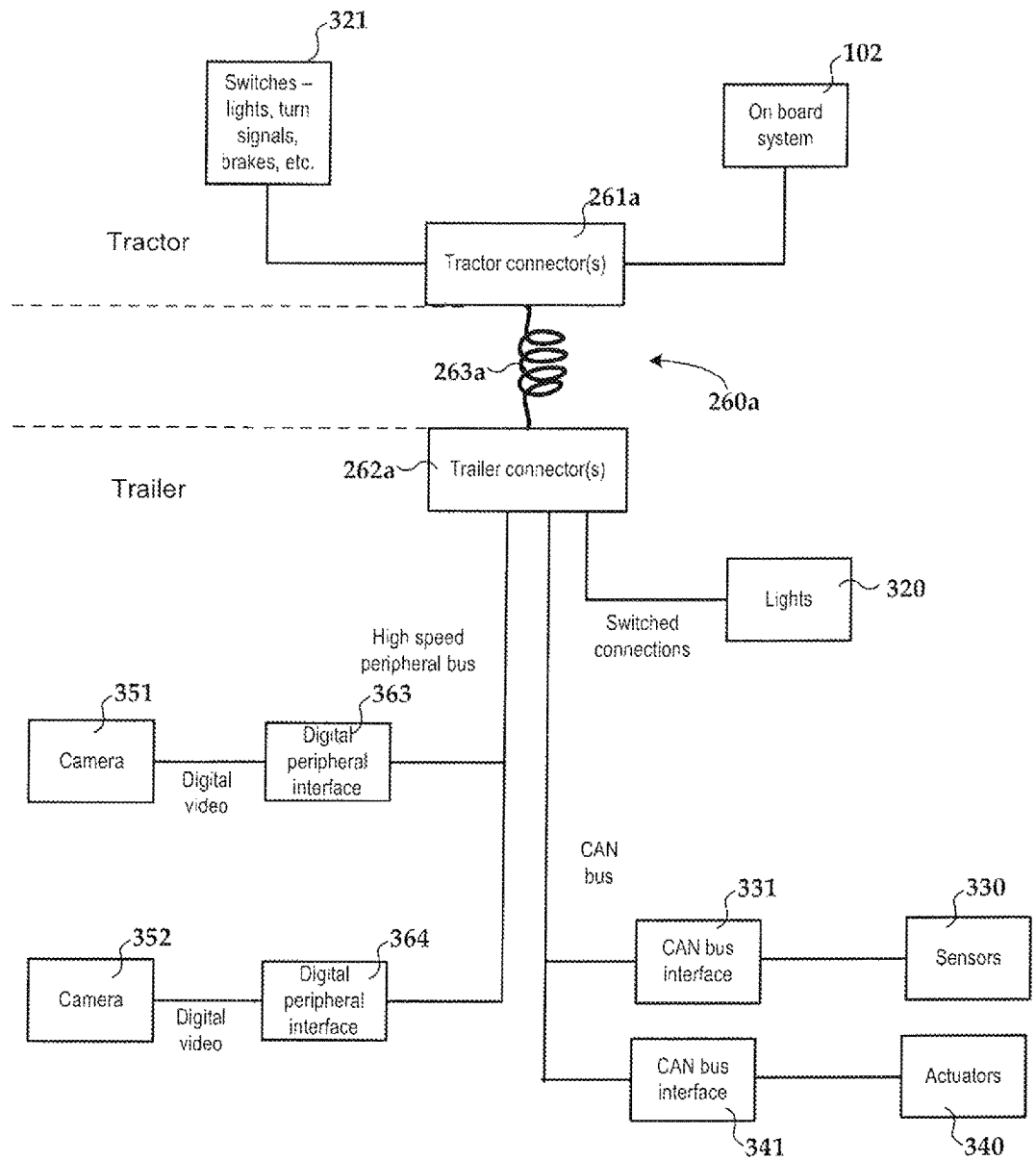
FIG. 3C is a schematic diagram illustrating an approach for transferring video signals from multiple cameras disposed on and/or within a trailer using a digital peripheral bus.

FIGS. 2B and 3B show vehicle 282 comprising a tractor 204 and trailer 205 that are communicatively coupled through a tractor trailer connection 260a comprising one or more tractor connectors 261a, one or more trailer connectors 262a and one or more cables 263a. In this embodiment, cables 371, 372 are respectively coupled to cameras 351, 352, which may be digital or analog video cameras, for example, Cable 371 carries the video output of camera 351 and cable 372 carries the video output of camera 352 from the trailer 205, through the tractor-trailer connection 260a, to the onboard system 102 of the tractor 204. For example, in some embodiments, the cables 371, 372 may be coax or twisted pair cables compatible various video configurations, such as video graphics adapter (VGA), digital video interface (DVI), high definition media interface (HDMI), universal serial bus (USB), IEEE 1394, Firewire, DisplayPort, or other configurations. In some implementations, the tractor-trailer connection 260a can include multiple connectors 261a, 262a, and cables 263a, e.g., one connector for each camera cable 371, 372, along with additional connectors and cables for lights, sensors, and/or actuators of the trailer. In some embodiments, one or more of the video connectors may be combined to one or more other trailer connections in a one connector having a unitary housing as discussed further herein. For example, the unitary connector may provide connections for power and switched conductors for lights 320, along data communication for sensors 330, actuators 340, and/or cameras 351, 352. Power lines are not shown in FIG. 2B, but would be provided to each camera 351, 352, light 320, sensor 330, and actuator 340 by power and ground wires separate from communication lines in this particular embodiment.

FIG. 3A is a schematic diagram showing communication lines for the trailer 205 shown in FIG. 2B. Trailer lights 320 are actuated through switched signals from light switches, turn signal switches, brake light switches 321, etc. actuated in the tractor 204 and communicated to the trailer through the tractor-trailer connection 260a. Sensors 330 and/or actuators 340 of the trailer may be coupled to the onboard system 102 through a data bus, such as a controller area network (CAN) bus. Sensors 320 and actuators 330 can be coupled to the CAN bus (or other type of data bus) through compatible data bus interfaces 331, 341 as shown in FIG. 3B.

FIG. 3B is a schematic diagram that illustrates digital cameras 351, 352 coupled to a high speed digital peripheral bus suitable for transferring video through suitable digital interfaces 353, 354. The digital peripheral bus may comprise optical conductors (with suitable receiver/transmitter optoelectronics) or electrical conductors. For example, the peripheral bus may comprise a Firewire, IEEE 1394, Thunderbolt, Ethernet, Gigabit Ethernet, Universal Serial Bus (USB) 2.0, USB 3.0, DisplayPort, or other type of high speed digital peripheral data bus, for example.

Figure 2C:
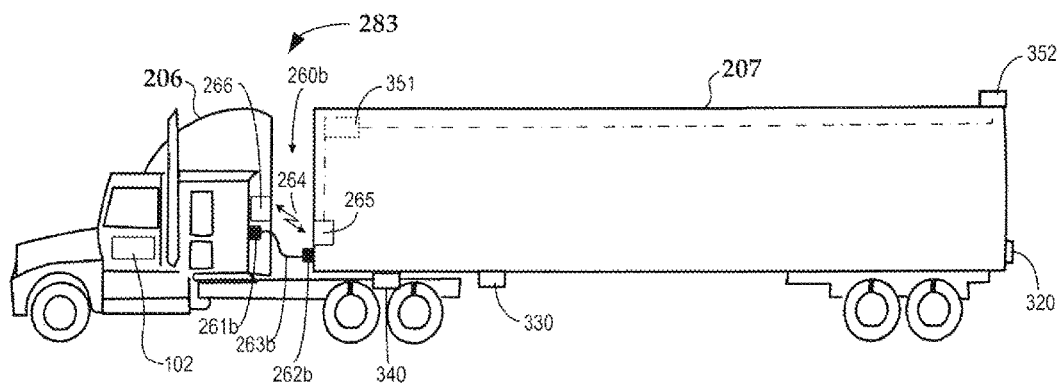
FIG. 2C is a diagram illustrating the use of a peripheral data bus for transferring digital video from cameras disposed on and/or within a trailer.
Figure 3D:
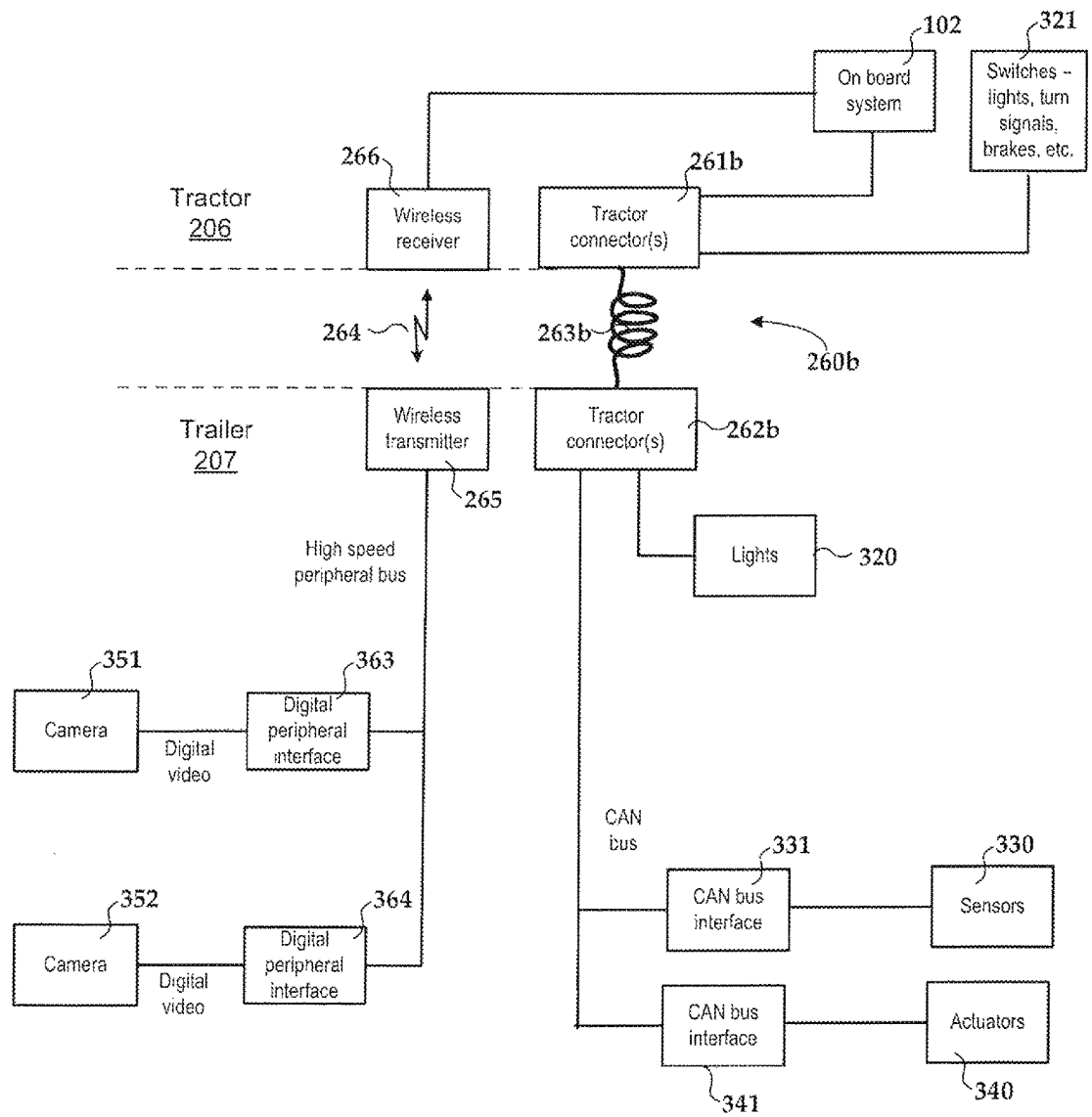
FIG. 3D is a schematic diagram illustrating an approach for wirelessly transferring video signals from multiple cameras disposed on and/or within a trailer.

In some embodiments, as shown in the diagram of FIG. 2C and the schematic of FIG. 3D, the tractor-trailer connection 260b includes one or more wireless communication connections 264 in addition to one or more wired connections via connector(s) 261b, 262b and cable(s) 263b. The vehicle 283 of FIG. 2C includes a wireless tractor-trailer communication link 264 which may be used to transmit video data from image capture devices on and/or within the trailer 207 to the tractor 206. As shown in the block diagram of FIG. 2C and the schematic diagram of FIG. 3D, the cameras 351, 352 are coupled through a peripheral bus to the wireless trailer transmitter 265. The trailer transmitter (or transceiver) 265 wirelessly transmits the video signals carried on the peripheral interface bus to the tractor receiver (or transceiver) 266. For example, the wireless link between the tractor and trailer may use WiFi® or Bluetooth® protocol. In some embodiments, the wireless link employs a transmitter and/or antenna design that provides a short range, directional and/or beam-shaped transmitted signal that has reduced range and a confined radiation pattern to avoid noise and crosstalk.

Figure 3E:
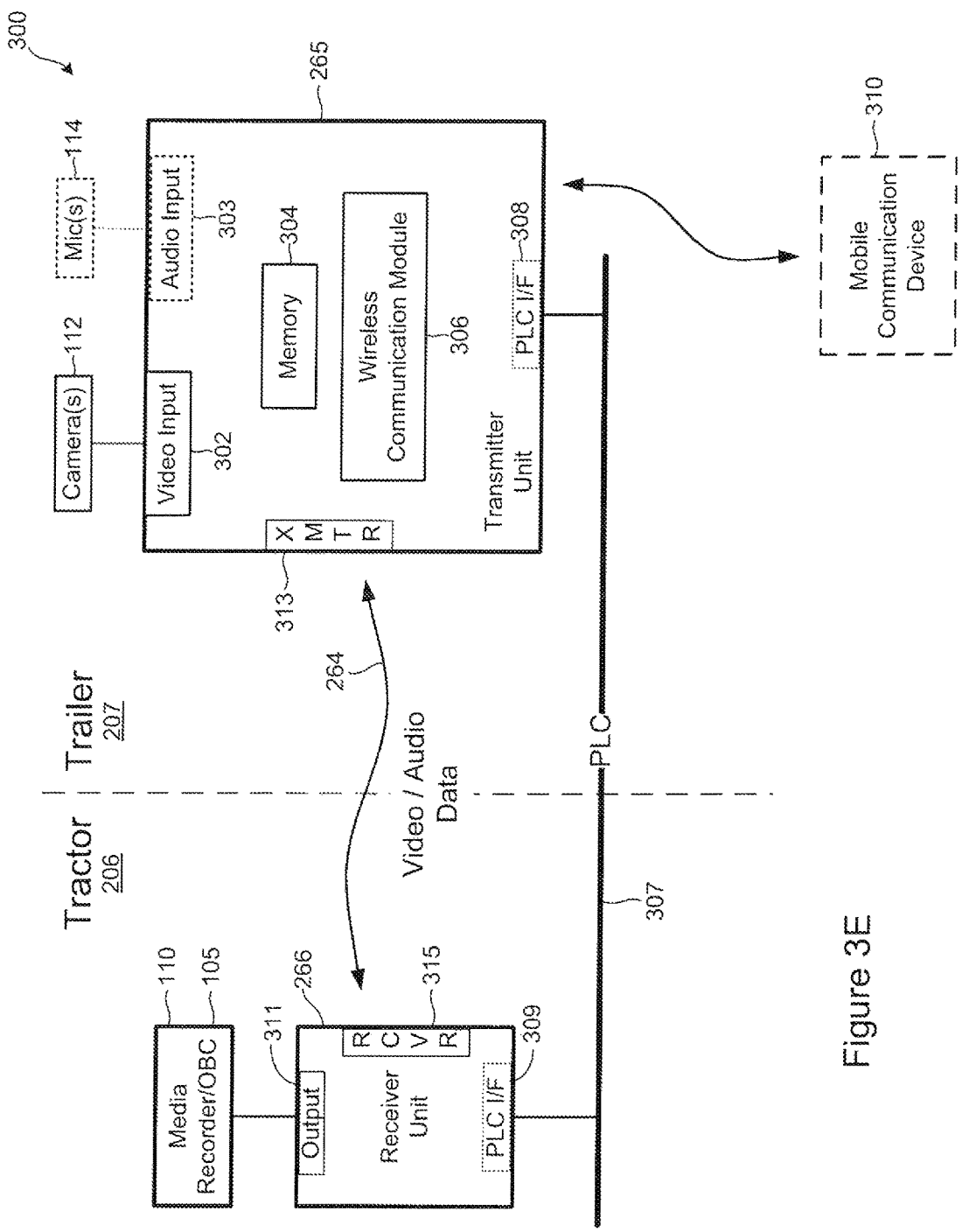
FIG. 3E is a block diagram of a system for implementing wireless communication between a tractor and a trailer of a commercial vehicle in accordance with various embodiments.

FIG. 3E is a block diagram of a system 300 for use on a vehicle comprising a tractor and trailer in accordance with various embodiments. FIG. 3 F is a block diagram showing additional components of the system 300 shown in FIG. 3E according to some embodiments. The embodiments shown in FIGS. 3E and 3F can be implemented in the context of the schematic of FIG. 3D in which information is transmitted between the trailer 207 and the tractor 206 via a wireless communication connection. The system 300 shown in FIGS. 3E and 3F include a transmitter unit 265 configured to be installed at the trailer 207. For example, the transmitter unit 265 can be mounted on an interior surface of the trailer 207 or on an exterior surface of the trailer 207. A receiver unit 266 is configured to be installed at the tractor 206, such as in the cab of the tractor 206 or on an exterior surface of the tractor 206.

The transmitter unit 265 includes a video input 302 configured to receive image data (e.g., video or still image data) from one or more cameras 112. The one or more cameras 112 can be mounted at various locations of the trailer 207. For example, one or more cameras 112 can be installed in the interior of the trailer 207. One or more cameras 112 can be mounted on the exterior of the trailer 207, such as on the sides or the rear (e.g., one or more backup cameras) of the trailer 207. In some embodiments, the transmitter unit 265 includes an audio input 303 which is configured to receive audio data from one or more microphones 114 mounted at the trailer 207 (e.g., a microphone of a camera 112 or a separate microphone). For example, one or more microphones 114 can be mounted on an interior surface of the trailer 207 for purposes of monitoring cargo sounds, such as shifting, as well as human voice sounds during loading and unloading of cargo to and from the trailer 207. One or more microphones 114 can be mounted on an exterior surface of the trailer 207 for purposes of monitoring for sounds indicative of vehicle proximity, brake wear, and proximity of, or contact with, objects during vehicle backup, for example.

The transmitter unit 265 includes a transmitter 313, which may be an RF transceiver, configured to transmit video and optionally audio data between the transmitter unit 265 and a receiver 315 (which may be an RF transceiver) of the receiver unit 266. Wireless communication between the transmitter 313 and the receiver 315 can be implemented using a known communication standard, such as a Wi-Fi® standard. For example, a 2.4 GHz ISM band with a multiplicity of hopping channels (e.g., 26 channels for FCC and 76 channels for CE implementations) can be implemented for effecting wireless communication between the transmitter 313 and the receiver 315. Enhanced immunity from noise and interference can be provided by using various known modulation techniques, including QAM, QPSK, and BPSK, for example. According to some embodiments, 1:1 pairing encryption can be implemented using various known techniques, such as use of a master-slave ID, user ID, or MAC ID, for example. In some embodiments, the software protocol and dedicated 1:1 pairing of the transmitter 313 and the receiver 315 are purposefully selected to be non-compatible with TCP/IP or other Internet protocols to provide enhanced noise immunity and security.

The transmitter unit 265 further includes a wireless communication module 306 which is configured to communicate with a mobile communication device 310. The mobile communication device 310 can be a tablet or smartphone, for example, of any operating system, such as an iOS or Android device. In some embodiments, the wireless communication module 306 can be a Bluetooth® module, such as a low energy Bluetooth® module (BLE). It is understood that other short range wireless communication protocols can be used to effect communications between the wireless communication module 306 and a mobile communication device 310. Preferably, the communication protocol of the wireless communication module 306 is selected so that it is different from and non-interfering with a communication protocol used by the transmitter 313 of the transmitter unit 265 and the receiver 315 of the receiver unit 266.

It is a significant challenge in the commercial transportation industry to uniquely identify the present location and disposition of a particular trailer amongst hundreds if not thousands of trailers used by fleets of commercial vehicles. Although the tractor may be known by an electronic fleet management system (e.g., vehicle ID), the trailer is typically unknown to such systems. According to various embodiments, the mobile communication device 310 can be used to input trailer related information to the transmitter unit 265 of a particular trailer 207. The trailer related information is stored in a memory 304 (nonvolatile memory) of the transmitter unit 265. According to embodiments of the present disclosure, the trailer ID and other information about the trailer, such as loading and cargo information, can be uploaded from the mobile communication device 310 and stored in the memory 304 of the transmitter unit 265 via the wireless communication module 306. Because a specific transmitter unit 265 is affixed to a particular trailer, the trailer ID and other related information is retained in the nonvolatile memory 304 and thereby physically associated with the particular trailer. The trailer ID and other related information can be communicated from the transmitter unit 265 to the receiver unit 266 and used by the media recorder 110 and/or onboard computer 105 to associate video and/or audio data with a particular trailer 207, as well as a particular tractor 206.

The mobile communication device 310 can execute an app or browser application that allows the user to input the trailer ID into the memory 304 of the transmitter unit 265. The app or application can also allow the user to input various related information about the trailer, including the type of trailer, size, length, weight, hitch type, line connections, power requirements (e.g., refrigeration power) and other information that uniquely describes the trailer 207. Once entered, this trailer related information can be stored in the nonvolatile memory 304. In some embodiments, loading and cargo information can also be entered by the user via the app or browser application executed by the mobile communication device 310. Information related to the weight, cargo type, special handling information, hazmat status, and other cargo-specific information can be entered into the memory 304. This cargo-specific information can be readily deleted or overwritten for each new shipment of cargo transported by a particular trailer. However, the trailer-specific information (e.g., trailer ID and optionally trailer details) is retained in the memory 304 and need not be re-inputted for each new cargo shipment.

Figure 3F:
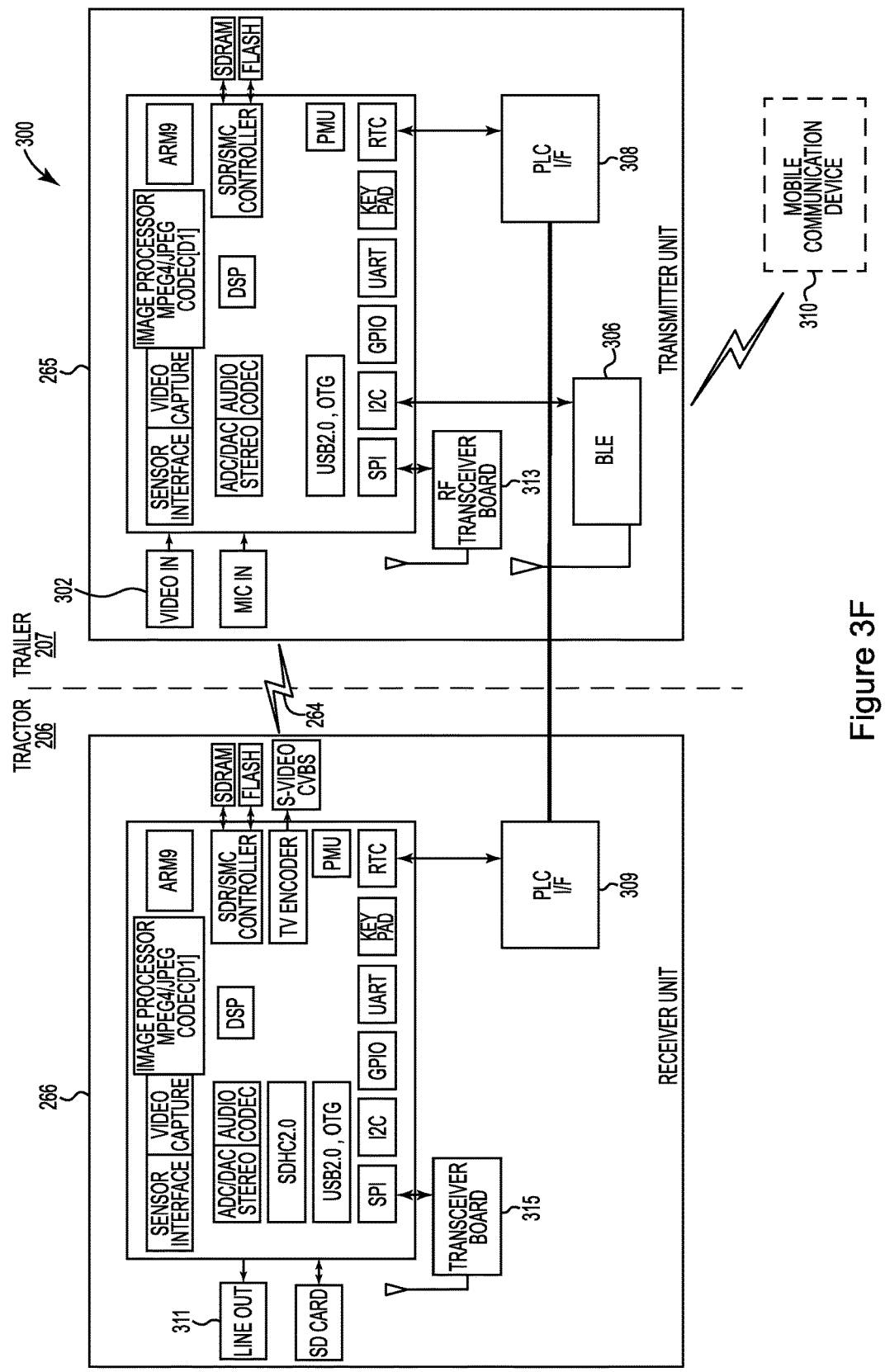
FIG. 3F is a block diagram showing additional components of the system shown in FIG. 3E according to some embodiments.

The receiver unit 266 includes an output 311 which can be configured to couple to one or both of a media recorder 110 or an onboard computer 105 provided at the tractor 206. In some embodiments, video, audio (optional), and trailer information is transferred between the transmitter 313 and the receiver 315 via the wireless communication connection 264 established between the transmitter unit 265 and the receiver unit 266. In other embodiments, only video and audio (optional) are transferred between the transmitter 313 and the receiver 315 via the wireless communication connection 264. In such embodiments, the trailer information is transferred between the transmitter unit 265 and the receiver unit 266 via a PLC connection 307. As is shown in FIGS. 3E and 3F, each of the transmitter unit 265 and the receiver unit 266 includes a power input coupled to a power line 307 of the vehicle. The power line 307 is configured to provide communication between various components of the vehicle via a known PLC communication protocol. The transmitter unit 265 includes a PLC interface 308 and the receiver unit 266 includes a PLC interface 309, which allows for communication of various signals between the two devices 265 and 266 over power lines of the vehicle, such as trailer-related data.

Figure 3G:
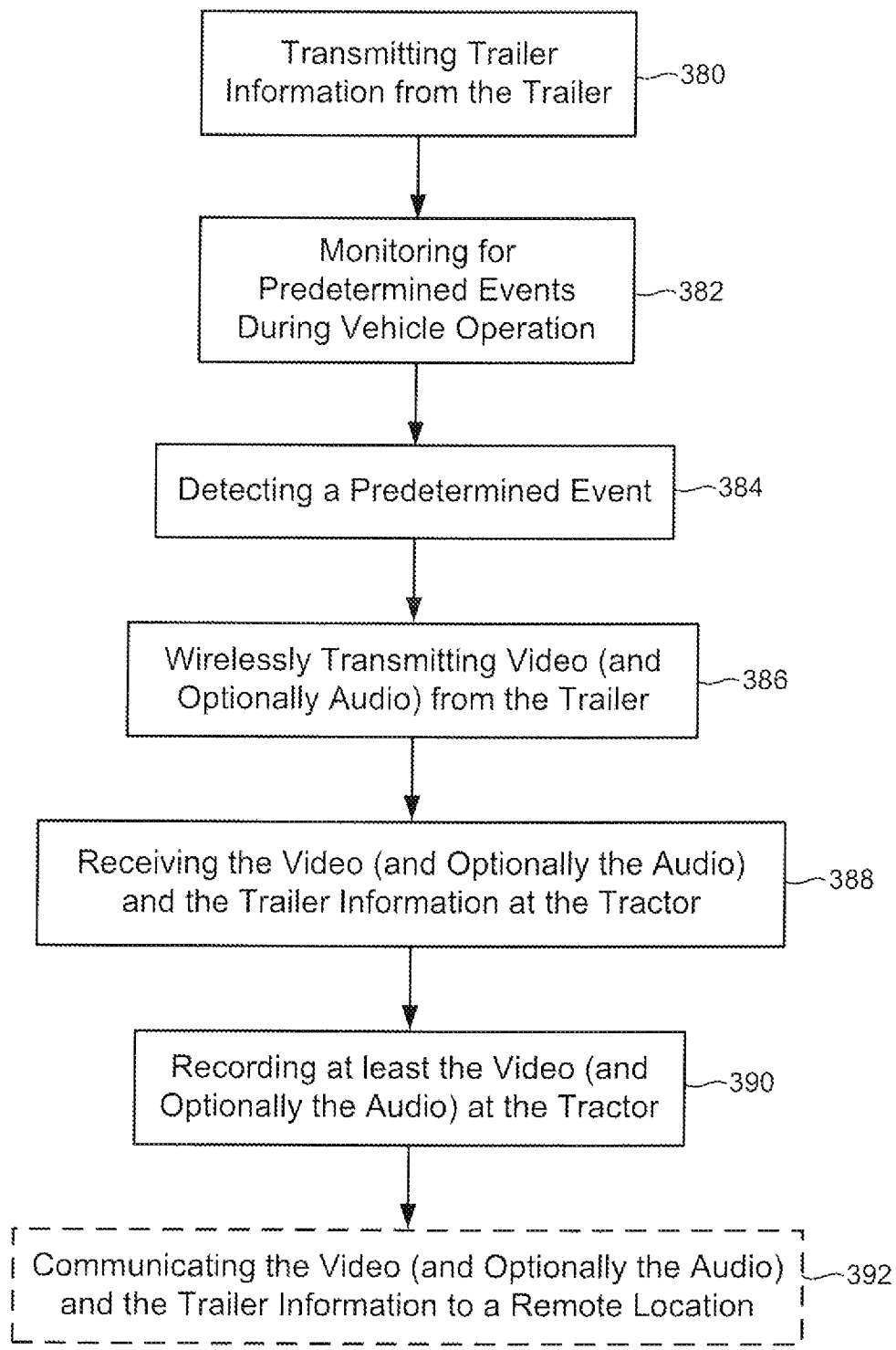
FIG. 3G illustrates various processes for implementing wireless communication between a tractor and a trailer of a commercial vehicle in accordance with various embodiments.

FIG. 3G illustrates various processes for implementing the method for use on a vehicle comprising a tractor and the trailer in accordance with various embodiments. The method shown in FIG. 3G involves transmitting 380 trailer information from the trailer of the vehicle, typically when the trailer is connected to the tractor of the vehicle. The method also involves monitoring 382 for predetermined events during vehicle operation. In response to detecting 384 predetermined event, video and optionally audio is wirelessly transmitted 386 from the trailer, and this information is received 388 at the tractor. The trailer information is also received 388 at the tractor. The method also involves recording 390 at least the video and optionally audio at the tractor. The video and optionally audio can be communicated 392 along with the trailer information to a remote location, such as a central office. According to the method illustrated in FIG. 3G, video, audio, sensor, trailer ID, and other trailer information can be acquired from a trailer of a vehicle and transmitted to the tractor and/or central office for analysis and/or remedial action.

Figure 4A:
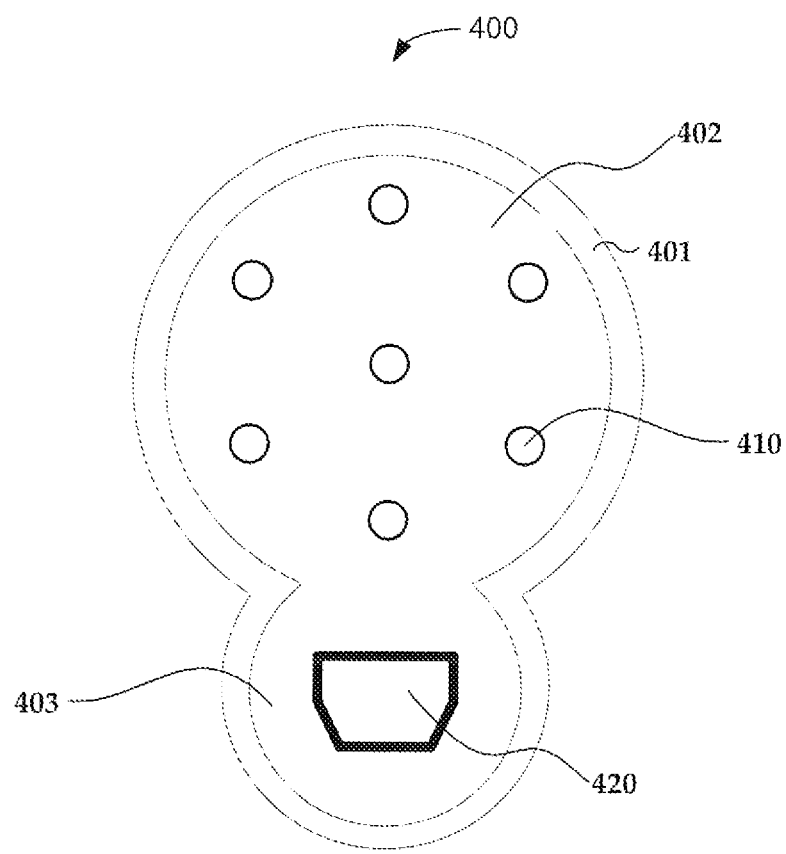
FIGS. 4A-4H are views of a connector configured to transfer signals from a trailer to a tractor in accordance with various embodiments.

FIGS. 4A through 4H are views of a tractor-trailer connector 400 that may be used to reduce cables between trailer to tractor. In some embodiments, the tractor-trailer connector 400 facilitates the use of one cable running between tractor and trailer to carry signals from video, light switches, sensors/diagnostics, and/or actuators. FIG. 4A depicts a front view of the connector 400 showing the terminals 410, 420. As illustrated in the diagram of FIG. 4A, the tractor-trailer connector 400 includes a unitary housing 401 that has a first area 402 and a second area 403. A plurality of first terminals 410 are arranged within the housing 401 in the first area 402 and a plurality of terminals 420 are arranged within the housing 401 in the second area 403. The first terminals 410 are arranged to be compatible with one or more standard tractor-trailer connectors, e.g., J560 or J1780, etc. Although there are 7 terminals shown in FIG. 4A, it will be appreciated that a different number of terminals may be used depending on the application. The terminals 420 of the second area 403 are compatible with a high speed peripheral data bus connection, e.g., IEEE 1394, Firewire, USB, etc. In some embodiments, the connector 400 may be used with one cable connector that connects a cable to terminals in both first and second areas (see, e.g., FIGS. 4F and 4G). In some embodiments, (see, e.g., FIG. 4H) the connector 400 may be coupled with two cable connectors, a first cable connector connecting a first cable to the first area 402 of connector 400 and a second cable connector connecting a second cable to the second area 403 of connector 400.

Figure 4B:
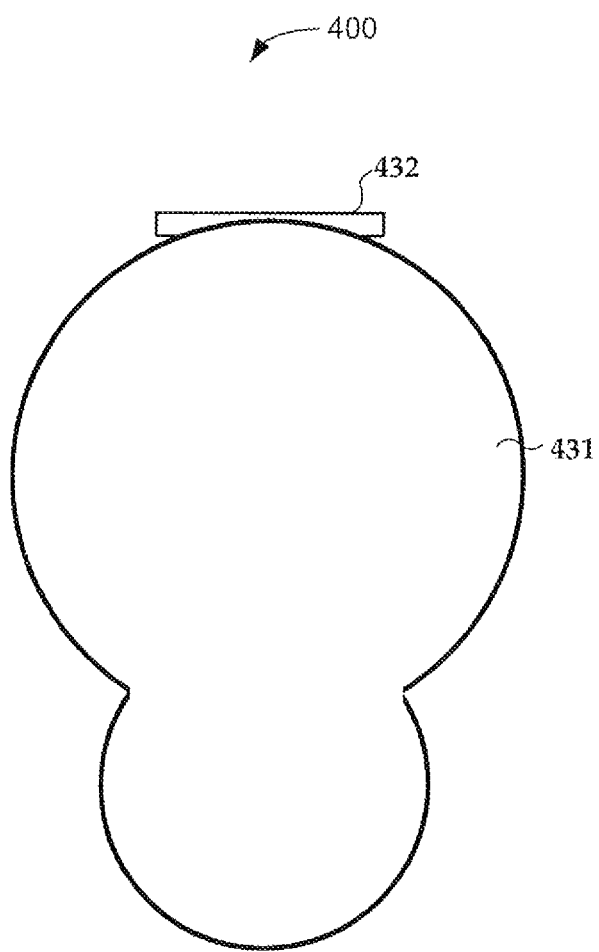

As illustrated in FIG. 4B, the connector 400 may include a cover comprising a hinge 432 and cover plate 431 that covers areas 402 and 403 when the connector 400 is not in use. As shown in the side view of FIG. 4F, when the connector 400 is in use and a cable connector 491 having a cable 492 attached thereto is inserted into connector 400, the cover plate 431 rotates to allow access to the terminals. In some embodiments, the cover plate 431 includes a protrusion 441 that mates with a compatible indentation 481 on the cable connector 491 for maintaining engagement between the connector 400 and the cable connector 491 during use.

Figure 4C:
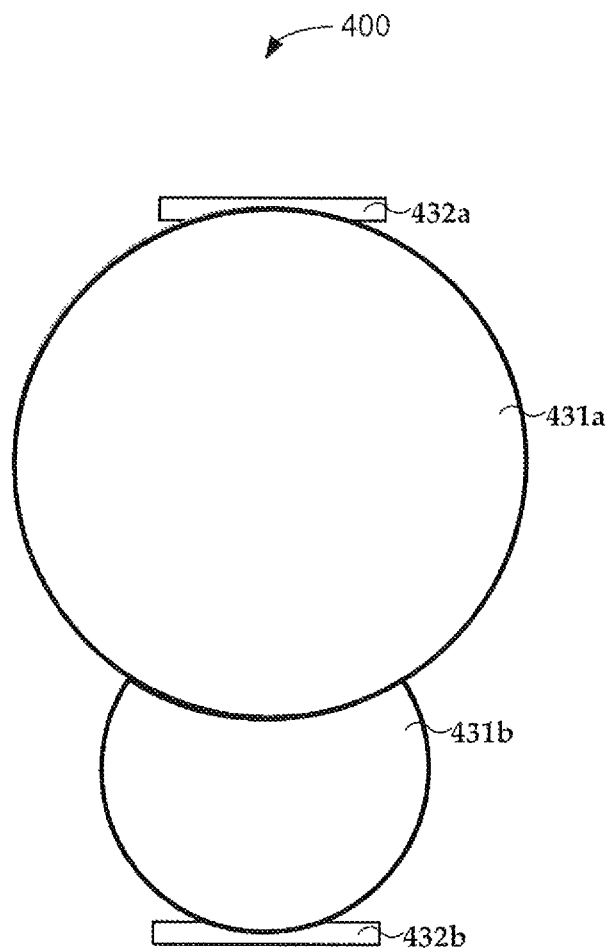
Figure 4D:
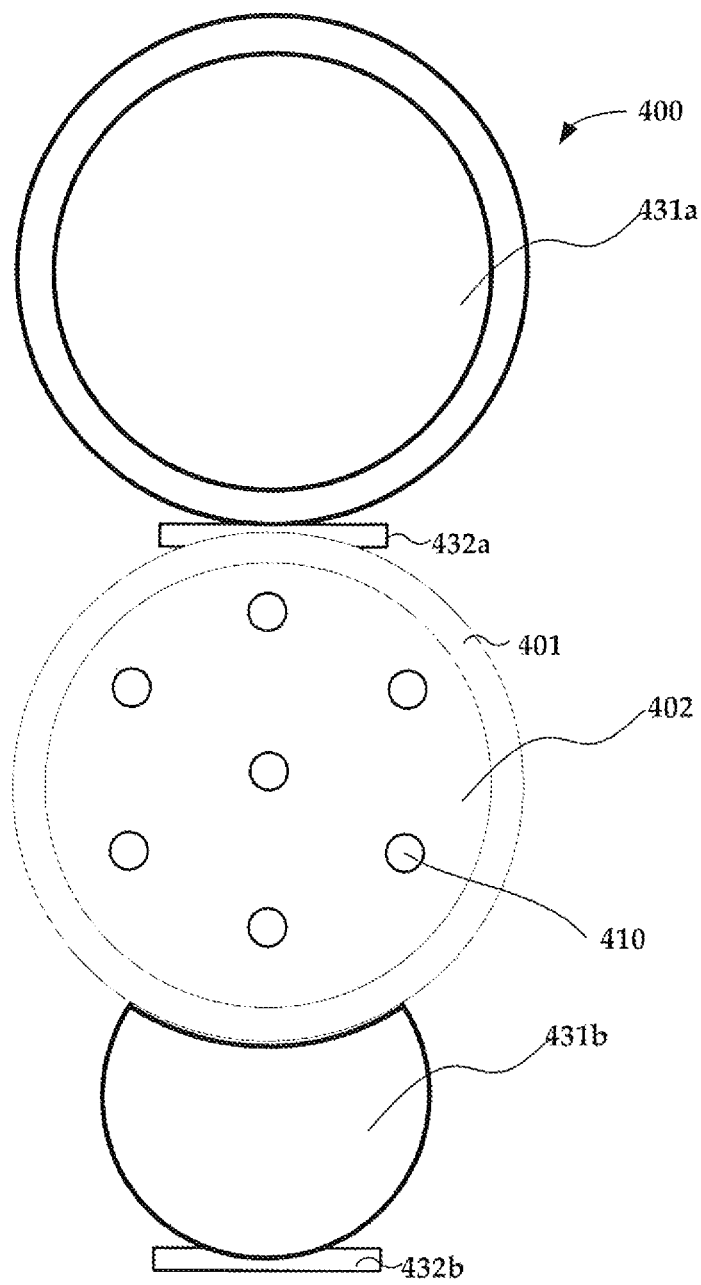
Figure 4E:
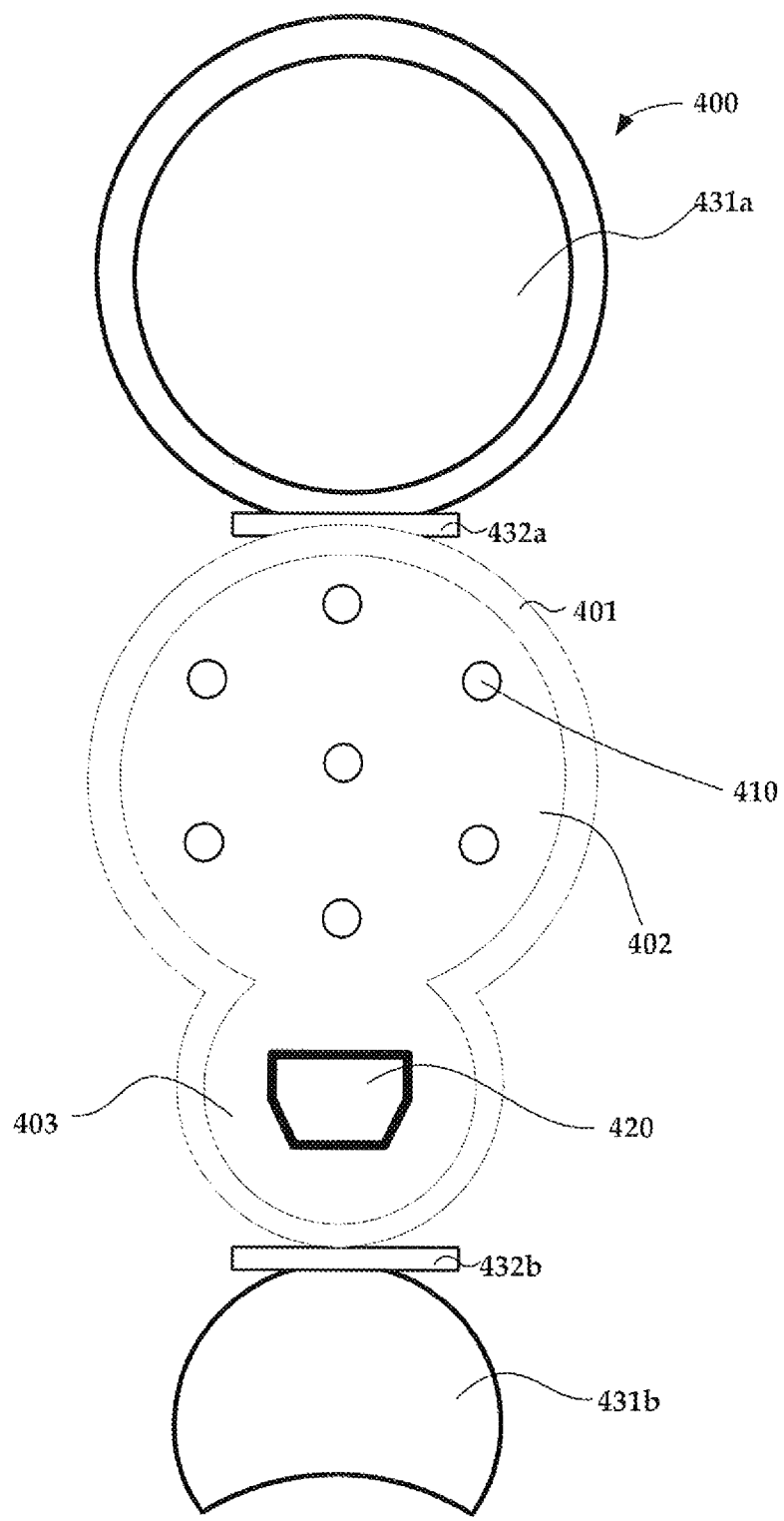
Figure 4F:
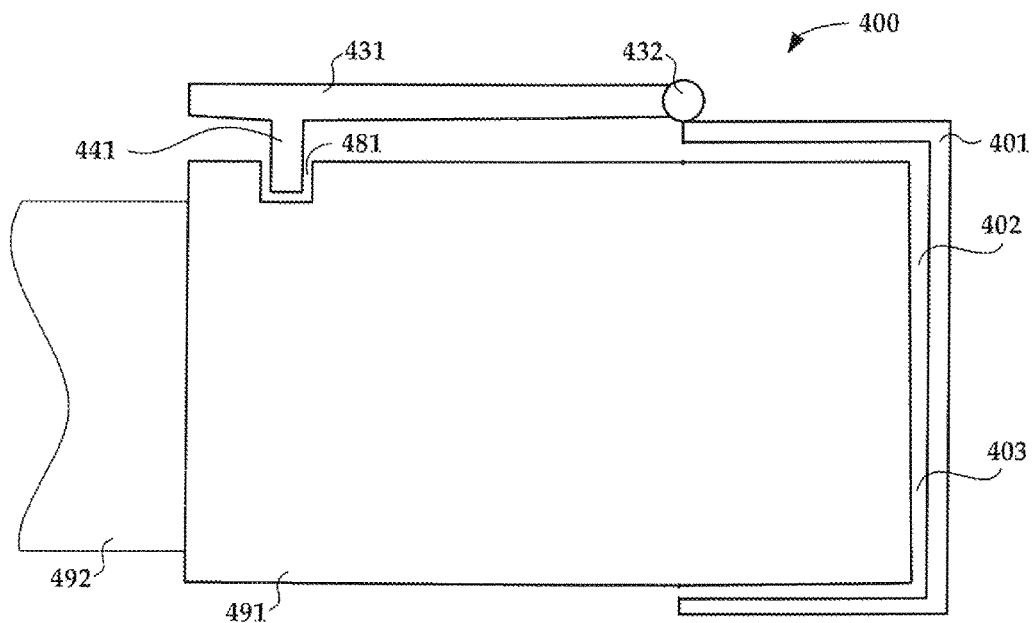
Figure 4G:
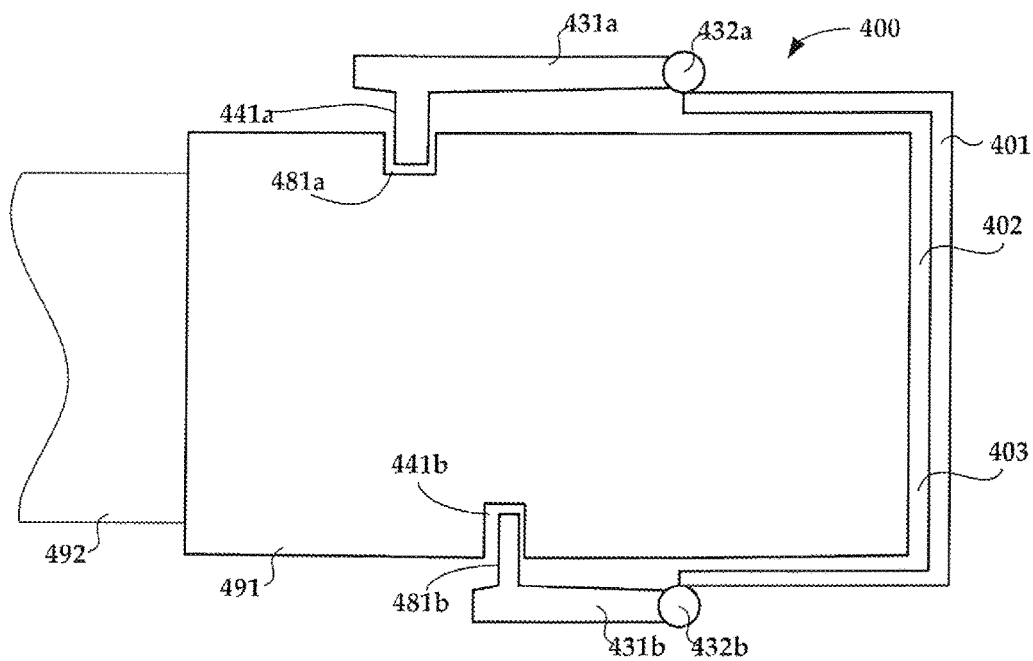
Figure 4H:
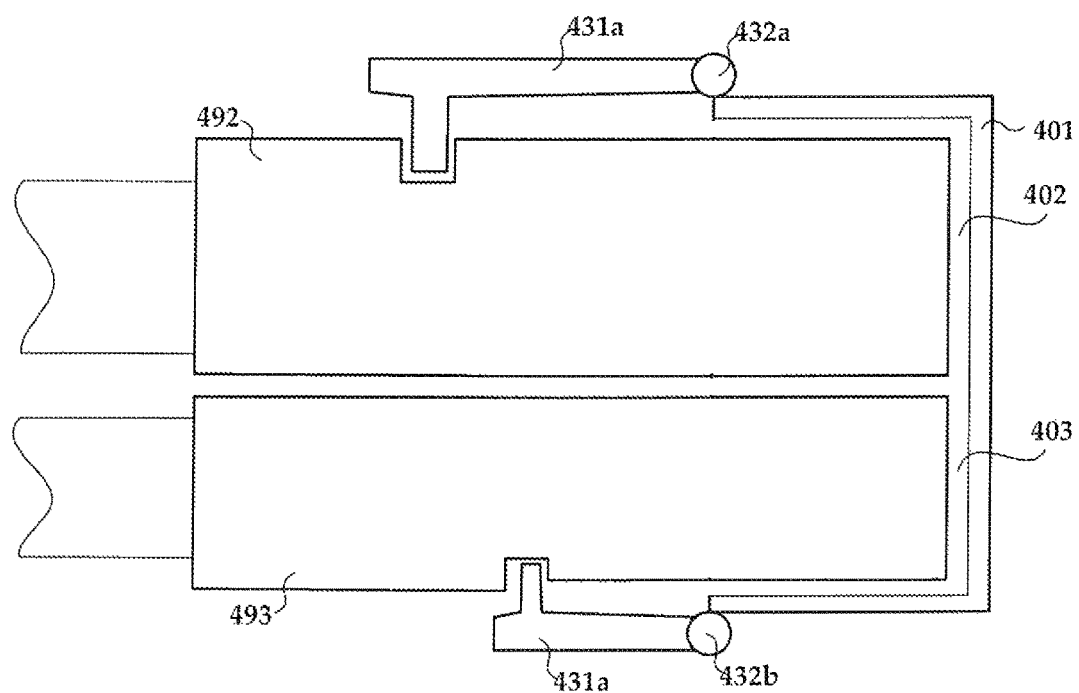

In some embodiments, shown in front views FIGS. 4C-4E and side views 4G-4H, the connector 400 may include two cover plates 431a, 431b that rotate independently using hinges 432a, 432b. The two cover plates 431a, 431b allow one of the areas 402, 403 of the connector 400 to be engaged with a cable connector while keeping the other area 403, 403 covered. As illustrated in FIG. 4G, one or both of the cover plates 431a, 431b may have a protrusion 441a, 441b that mates with a compatible indentation 481a, 482a on the cable connector 491 to securely maintain the connection between the cable connector 491 and connector 400. FIG. 4H illustrates the use of the connector 400 with a first cable connector 492 coupled to the first area of connector 400 and a second cable connector 493 coupled to the second area of connector 400.

The tractor-trailer connections discussed herein can be used in systems that use in-trailer images capture devices.

In some embodiments, a system may include an event detector configured to generate a trigger signal in response to occurrence of predetermined events, a media recorder, a communications device configured to effect communications between the system and a remote system, an onboard computer coupled to the event detector, the media recorder, and the communications device, one or more image capture devices situated within the trailer, and a tractor-trailer connection. The tractor-trailer connection is configured to communicatively couple the one or more image capture devices to one or both of the onboard computer and the media recorder. The onboard computer coordinates recording of image data received from the one or more image capture devices on the media recorder in response to the trigger signal.

According to some embodiments, a system for use on a vehicle comprising a tractor and a trailer includes a sensor configured for installation on the trailer and to produce a sensor signal in response to a sensed event, an auxiliary detector configured to receive the sensor signal and generate an auxiliary detector signal in response to the sensor signal exceeding one or more thresholds, an event detector configured to generate a trigger signal in response to occurrence of predetermined events, a media recorder, a communications device configured to effect communications between the system and a remote system, an onboard computer coupled to the event detector, the media recorder, and the communications device, one or more image capture devices situated within the trailer, and a tractor-trailer connection. The tractor-trailer connection communicatively couples the one or more image capture devices to one or both of the onboard computer and the media recorder. The onboard computer is configured to coordinate recording of image data received from the one or more image capture devices on the media recorder and store event data in response to one or both of the auxiliary detector signal and the trigger signal.

According to some embodiments, a system for use on a vehicle comprising a tractor and a trailer includes a communications device configured to effect communications between the system and a remote system, the communications device configured to receive data from the remote system, an event detector configured to generate a trigger signal in response to detecting occurrence of predetermined events, wherein operation of the event detector is affected by the data received from the remote system, a media recorder, an onboard computer coupled to the event detector, the media recorder, and the communications device, one or more image capture devices situated within the trailer, and a tractor-trailer connection. The tractor-trailer connection communicatively couples the one or more image capture devices to one or both of the onboard computer and the media recorder. The onboard computer is configured to coordinate recording of image data received from the one or more image capture devices on the media recorder and store event data in response to one or both of the trigger signal and the data received from the remote system.

Additional information about systems and methods using in trailer capture data are described in U.S. Provisional Patent Application No. 62/038,720 filed on Aug. 18, 2014, and incorporated herein by reference.

The tractor-trailer connections disclosed herein can be used in a system that provides real-time transmission of image capture data.

According to some embodiments, a system for use on a vehicle comprising a tractor and a trailer includes an event detector configured to generate a trigger signal in response to detecting occurrence of predetermined events, a media recorder, a communications device configured to effect communications between the system and a remote system, an onboard computer coupled to the event detector, the media recorder, and the communications device, the onboard computer configured to communicate with a computer of the vehicle, one or more image capture devices situated on the vehicle, including one or more images capture devices situated on and/or within the trailer, and a tractor-trailer connection. The tractor-trailer connection is configured communicatively couple image data from the one or more image capture devices situated on and/or within the trailer to one or both of the onboard computer and the media recorder. The onboard computer is configured to coordinate capturing of image data received from the one or more image capture devices in response to trigger signals and to transmit the captured image data and event data derived from vehicle computer data in substantially real-time to the remote system.

In some embodiments, a system for use on a vehicle comprising a tractor and a trailer includes an event detector configured to generate a trigger signal in response to detecting occurrence of predetermined events, a media recorder, a communications device configured to effect communications between the system and a remote system, an onboard computer coupled to the event detector, the media recorder, and the communications device, the onboard computer configured to communicate with a computer of the vehicle, a display configured for operation within the tractor and coupled to the onboard computer, one or more image capture devices situated on and/or within the vehicle, including one or more image capture devices situated on the trailer, and a tractor-trailer connection. The tractor-trailer connection is configured to communicatively couple the one or more image capture devices situated on and/or within the trailer to one or both of the onboard computer and the media recorder. The onboard computer is configured to coordinate capturing of image data received from the one or more image capture devices in response to trigger signals and to transmit the captured image data and event data derived from vehicle computer data in substantially real-time to the display and the remote system.

According to some embodiments, a system for use on a vehicle comprising a tractor and a trailer includes an event detector configured to generate a trigger signal in response to detecting occurrence of predetermined events, a media recorder, a communications device configured to effect communications between the system and a remote system, the communications device configured to receive a command signal from the remote system, an onboard computer coupled to the event detector, the media recorder, and the communications device, the onboard computer configured to communicate with a computer of the vehicle, one or more image capture devices situated on and/or within the vehicle, including one or more image capture devices situated on and/or within the trailer; and a tractor-trailer connection. The tractor-trailer connection configured to communicatively couple the one or more image capture devices situated on and/or within the trailer to one or both of the onboard computer and the media recorder. An onboard computer is configured to coordinate capturing of image data received from the one or more image capture devices in response to one or both of the trigger signals and the command signal, and to transmit the captured image data and event data derived from vehicle computer data in substantially real-time to the remote system in response to the command signal.

Additional information about systems and methods of real time data transmission of image capture data are described in U.S. Provisional Patent Application No. 62/038,724 filed on Aug. 18, 2014, and incorporated herein by reference.

The tractor-trailer connections disclosed herein can be used in a system that provides for modifying an onboard image capture strategy using an external source.

In some embodiments, a system for use on a vehicle comprising a tractor and a trailer includes an event detector coupled to the onboard computer and configured to generate a trigger signal in response to detecting occurrence of predetermined events, an onboard computer coupled to the event detector and configured to communicate with a computer of the vehicle and an external source of data, one or more image capture devices situated at the vehicle, including one or more image capture devices disposed on and/or within the trailer, and a tractor-trailer connection. The tractor-trailer connection is configured to communicatively couple the one or more image capture devices situated on and/or within the trailer to the onboard computer. The onboard computer is configured to adjust an image capture strategy affecting the one or more image capture devices based on data received from the external source and to store image data received from the one or more image capture devices and event data in response to the trigger signal.

In some embodiments, a system for use on a vehicle comprising a tractor and a trailer includes a communications device configured to effect communications between the system and a remote system, the communications device configured to receive data from a source external to the vehicle, an event detector configured to generate a trigger signal in response to detecting occurrence of predetermined events, a media recorder, an onboard computer coupled to the communications device, the event detector, and the media recorder, the onboard computer configured to communicate with a computer of the vehicle, one or more image capture devices situated at the vehicle including one or more image capture devices situated on and/or within the trailer, and a tractor-trailer connection. The tractor-trailer connection is configured to communicatively couple the one or more image capture devices situated on and/or within the trailer to one or both of the onboard computer and the media recorder. The onboard computer is configured to adjust one or more parameters of the image capture devices based on the data received from the external source and coordinate recording of image data received from the one or more image capture devices on the media recorder and to store event data in response to the trigger signal.

According to some embodiments, a system for use on a vehicle comprising a tractor and a trailer includes a communications device configured to effect communications between the system and a remote system, the communications device configured to receive data from a source external to the vehicle, an event detector configured to generate a trigger signal in response to detecting occurrence of predetermined events, a media recorder, an onboard computer coupled to the communications device, the event detector, and the media recorder, the onboard computer configured to communicate with a computer of the vehicle, one or more image capture devices situated at the vehicle including one or more image capture devices situated on and/or within the trailer, and a tractor-trailer connection. The tractor-trailer connection is configured to communicatively couple the one or more image capture devices situated on and/or within the trailer to one or both of the onboard computer and the media recorder. The onboard computer is configured to adjust an image capture strategy affecting the one or more image capture devices based on the data received from the external source and coordinate recording of image data received from the one or more image capture devices on the media recorder and to store event data in response to the trigger signal.

Additional information about systems and methods of real time data transmission of image capture data are described in U.S. Provisional Patent Application No. 62/038,717 filed on Aug. 18, 2014, and incorporated herein by reference.

The tractor-trailer connections disclosed herein can be used in a system that modifies an onboard event detection strategy using an external source.

In some embodiments a system for use on a vehicle comprising a tractor and a trailer includes an event detector configured to generate a trigger signal in response to detecting occurrence of predetermined events, an onboard computer coupled to the event detector and configured to communicate with a computer of the vehicle and an external source of data, one or more image capture devices situated at the vehicle including one or more image capture devices situated on and/or within the trailer, and a tractor-trailer connection. The tractor-trailer connection is configured to communicatively couple the one or more image capture devices situated on and/or within the trailer to the onboard computer. The onboard computer is configured to modify one or more parameters of the event detector based on data received from the external source and to store image data received from the one or more image capture devices and event data in response to a trigger signal generated by the modified event detector.

According to some embodiments, a system for use on a vehicle comprising a tractor and a trailer includes a communications device configured to effect communications between the system and a remote system, the communications device configured to receive data from a source external to the vehicle, an event detector configured to generate a trigger signal in response to detecting occurrence of predetermined events, wherein operation of the event detector is modified by the data received from the external source, a media recorder; an onboard computer coupled to the communications device, the event detector, and the media recorder, the onboard computer configured to communicate with a computer of the vehicle, one or more image capture devices situated at the vehicle including one or more image capture devices situated on and/or within the trailer, and a tractor-trailer connection. The tractor-trailer connection is configured to communicatively couple the one or more image capture devices situated on and/or within the trailer to one or both of the onboard computer and the media recorder. The onboard computer is configured to coordinate recording of image data received from the one or more image capture devices on the media recorder and to store event data in response to a trigger signal generated by the modified event detector.

Some embodiments are directed to a system for use on a vehicle comprising a tractor and a trailer that includes a communications device configured to effect communications between the system and a remote system, the communications device configured to receive data from a source external to the vehicle, an event detector configured to generate a trigger signal in response to detecting occurrence of predetermined events, a media recorder, an onboard computer coupled to the communications device, the event detector, and the media recorder, the onboard computer configured to communicate with a computer of the vehicle, one or more image capture devices situated at the vehicle including on or more image capture devices situated on and/or within the trailer, and a tractor-trailer connection. The tractor-trailer configured to communicatively couple the one or more image capture devices situated on and/or within the trailer to one or both of the onboard computer and the media recorder. The onboard computer is configured to modify an event detection strategy affecting at least the event detector based on data received from the external source and to coordinate recording of image data received from the one or more image capture devices on the media recorder and to store event data in response to a trigger signal generated by the modified event detector.

Additional information about systems and methods of real time data transmission of image capture data are described in U.S. Provisional Patent Application No. 62/038,725 filed on Aug. 18, 2014, and incorporated herein by reference.

The tractor-trailer connections disclosed herein can be used in cargo management systems.

In some embodiments, a system for use with a vehicle comprising a tractor and a trailer includes one or more image capture devices including one or more images capture devices disposed on and/or within the trailer, an image processor positioned in the tractor and configured to estimate available cargo space within the trailer based on the images captured by the image capture devices, and a tractor-trailer connection. The tractor-trailer connection is configured to communicatively couple the one or more image capture devices positioned on and/or within the trailer to the image processor.

Some embodiments are directed to a system for use with a vehicle comprising a tractor and a trailer including one or more image capture devices including one or more images capture devices positioned on and/or within the trailer and configured to capture images, an image processor configured to determine dimensions of the cargo items using the captured images, a loading processor configured to generate a loading plan for the cargo items using the dimensions, and a tractor-trailer connection that that transfers the captured images between the trailer and the tractor.

According to some embodiments, a system for use with a vehicle comprising a tractor and a trailer includes one or more image capture devices including one or more image capture devices positioned on and/or within the trailer, each image capture device configured to capture images of cargo items as or after the cargo items are unloaded from the trailer, an image processor positioned in the tractor and configured to determine characteristics of the cargo items as the cargo items are unloaded from the trailer using the captured images, a docking processor configured to generate a cross-docking distribution plan for distributing the cargo items to a plurality of secondary trailers based on the characteristics, and a tractor-trailer connection configured to transfer the captured images from the trailer to the tractor.

In some embodiments a system for use with a vehicle comprising a tractor and a trailer, the system includes one or more image capture devices including one or more image capture devices positioned on and/or within the trailer, each image capture device configured to capture images of cargo items as the cargo items are loaded onto or unloaded from the trailer, an event detector positioned in the tractor and configured to detect one or both of anomalous loading and unloading events based on the captured images, and a tractor-trailer connection configured to transfer images between the trailer and the tractor.

Additional information about systems and methods of real time data transmission of image capture data are described in U.S. Provisional Patent Application No. 62/038,706 filed on Aug. 18, 2014, and incorporated herein by reference.

Systems, devices, or methods disclosed herein may include one or more of the features, structures, methods, or combinations thereof described herein. For example, a device or method may be implemented to include one or more of the features and/or processes described herein. It is intended that such device or method need not include all of the features and/or processes described herein, but may be implemented to include selected features and/or processes that provide useful structures and/or functionality. The systems described herein may be implemented in any combination of hardware, software, and firmware. Communication between various components of the systems can be accomplished over wireless or wired communication channels.

Hardware, firmware, software or a combination thereof may be used to perform the functions and operations described herein. Using the foregoing specification, some embodiments of the disclosure may be implemented as a machine, process, or article of manufacture by using standard programming and/or engineering techniques to produce programming software, firmware, hardware or any combination thereof. Any resulting program(s), having computer-readable program code, may be embodied within one or more computer-usable media such as memory devices or transmitting devices, thereby making a computer program product, computer-readable medium, or other article of manufacture according to the invention. As such, the terms "computer-readable medium," "computer program product," or other analogous language are intended to encompass a computer program existing permanently, temporarily, or transitorily on any computer-usable medium such as on any memory device or in any transmitting device. From the description provided herein, those skilled in the art are readily able to combine software created as described with appropriate general purpose or special purpose computer hardware to create a computing system and/or computing subcomponents embodying various implementations of the disclosure, and to create a computing system(s) and/or computing subcomponents for carrying out the method embodiments of the disclosure.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. A system for use on a vehicle comprising a tractor and a trailer, the system comprising:
   a transmitter unit configured for mounting at the trailer, the transmitter unit comprising:
      a video input configured to receive video data from one or more cameras mounted at the trailer, at least one of the one or more cameras spaced away from the transmitter unit;
      a power input configured to receive power from a power line of the trailer;
      a wireless communication module configured to communicate with a hand-held mobile communication device via a short range wireless communication link, the hand-held mobile communication device comprising a tablet or a smartphone;
      a memory of the transmitter unit configured to store trailer information received from the hand-held mobile communication device via the wireless communication module, the trailer information comprising at least trailer ID data that uniquely identifies the trailer; and
      a transmitter configured to wirelessly transmit the video data;
   a receiver unit configured for mounting at the tractor, the receiver unit comprising:
      a receiver configured to wirelessly receive the video data transmitted by the transmitter;
      a power input configured to receive power from a power line of the tractor; and an output configured to output the received video data;
wherein the receiver unit is further configured to receive the trailer information from the transmitter unit;
a media recorder configured for mounting at the tractor, the media recorder coupled to the receiver and configured to store the video data received by the receiver;
an onboard computer configured for mounting at the tractor, wherein one of the media recorder and the onboard computer is configured to associate the trailer ID with the video data stored on the media recorder; and
an onboard communication device coupled to one or both of the media recorder and the onboard computer, wherein the onboard communication device is configured to transmit the video data and associated trailer ID to a remote system.

2. The system of claim 1, wherein:
the transmitter unit further comprises an audio input configured to receive audio data from one or more microphones mounted at the trailer, and the transmitter is configured to wirelessly transmit the audio data; and
the receiver unit is further configured to wirelessly receive the audio data transmitted by the transmitter, and the output is configured to output the received audio data.

3. The system of claim 1, wherein the trailer information comprises trailer load or cargo information.

4. The system of claim 1, wherein the receiver is further configured to wirelessly receive the trailer information from the transmitter.

5. The system of claim 1, wherein power lines of the trailer and the tractor that supply power to the transmitter unit and the receiver unit are configured to support powerline communication (PLC) for the vehicle.

6. The system of claim 1, wherein:
each of the transmitter unit and the receiver unit comprises a powerline communication (PLC) interface; and
the trailer information is communicated from the transmitter unit to the receiver unit via the respective PCL interfaces and power lines of the trailer and tractor.

7. The system of claim 1, wherein the short range wireless communication link conforms to a Bluetooth® standard.

8. The system of claim 1, wherein the transmitter unit and receiver unit are configured to wirelessly communicate via a communication protocol different from and non-interfering with a communication protocol of the wireless communication module.

9. The system of claim 1, wherein:
the transmitter unit and receiver unit are configured to wirelessly communicate via a communication protocol that conforms to a Wi-Fi® standard; and
the wireless communication module is configured to wirelessly communicate via a Bluetooth® standard.

10. A system for use on a vehicle comprising a tractor and a trailer, the system comprising:
an onboard system configured for mounting at the tractor comprising:
an event detector configured to generate a trigger signal in response to occurrence of predetermined events derived from a vehicle computer;
a media recorder;
a communications device configured to effect communications between the system and a remote system; and
an onboard computer coupled to the event detector, the media recorder, and the communications device;
one or more image capture devices mounted at the trailer; and
a wireless communication apparatus coupled to the media recorder and comprising:
a transmitter unit configured for mounting at the trailer and to wirelessly transmit image data received from the one or more image capture devices, the transmitter unit comprising a wireless communication module configured to effect communication with a hand-held mobile communication device via a short range wireless communication link and further comprising a memory of the transmitter unit configured to store trailer information comprising trailer ID received from the hand-held mobile communication device via the wireless communication module; and
a receiver unit configured for mounting at the tractor and to wirelessly receive the image data transmitted by the transmitter unit, the receiver unit further configured to output the received image data to the media recorder and to receive the trailer information from the transmitter unit;
wherein the onboard computer is configured to coordinate recording of at least the image data on the media recorder in response to the trigger signal and to associate the trailer ID with at least the image data.

11. The system of claim 10, wherein the onboard computer is configured to coordinate storing of vehicle data in response to the trigger signal.

12. The system of claim 10, wherein the onboard computer is configured to effect communication of recorded image data and vehicle data associated with occurrence of a predetermined event to the remote system.

13. The system of claim 10, wherein:
the transmitter unit further comprises an audio input configured to receive audio data from one or more microphones mounted at the trailer, and the transmitter is configured to wirelessly transmit the audio data; and
the receiver unit is further configured to wirelessly receive the audio data transmitted by the transmitter and to output the received audio data.

14. The system of claim 10, wherein the trailer information comprises trailer load or cargo information.

15. The system of claim 10, wherein:
each of the transmitter unit and the receiver unit comprises a powerline communication (PLC) interface; and
the trailer information is communicated from the transmitter unit to the receiver unit via the respective PCL interfaces and power lines of the trailer and tractor.

16. The system of claim 10, wherein the transmitter unit and the receiver unit are configured to wirelessly communicate via a communication protocol different from and non-interfering with a communication protocol of the wireless communication module.

17. The system of claim 10, wherein:
the transmitter unit and the receiver unit are configured to wirelessly communicate via a communication protocol that conforms to a Wi-Fi® standard; and
the wireless communication module is configured to wirelessly communicate via a Bluetooth® standard.

18. A method for use on a vehicle comprising a tractor and a trailer, the method comprising:
wirelessly receiving, at the trailer, trailer information including trailer ID from a hand-held mobile communication device via a short range wireless communication link;
transmitting the trailer information including trailer ID information from the trailer;

monitoring for occurrences of predetermined events derived from a vehicle computer while the vehicle is in operation; and in response to detecting a predetermined event:
wirelessly transmitting video from the trailer;
receiving the video and the trailer information at the tractor;
recording at least the video at the tractor; and
associating the trailer information with at least the video.

19. The method of claim 18, further comprising in response to detecting the predetermined event:
wirelessly transmitting audio from the trailer;
receiving the audio at the tractor; and
recording the audio contemporaneously with the video.

20. The method of claim 18, wherein the transmitting the trailer information comprises transmitting the trailer information via a wired connection between the trailer and the tractor.

21. The method of claim 18, further comprising:
storing vehicle data in response to predetermined event; and
communicating the video and the vehicle data to a remote location.

22. The method of claim 18, wherein a communication protocol for wirelessly transmitting and receiving the video is different from and non-interfering with a communication protocol for wirelessly receiving the trailer information.

23. The system of claim 10, wherein the hand-held mobile communication device comprises a tablet or a smartphone.

24. The method of claim 18, wherein the hand-held mobile communication device comprises a tablet or a smartphone.

* * * * *